United States Patent
Agrawal et al.

(10) Patent No.: US 9,160,418 B2
(45) Date of Patent: Oct. 13, 2015

(54) NEAR FIELD COMMUNICATION METHOD AND APPARATUS THEREOF

(71) Applicant: Samsung Electronics Co. Ltd., Suwon-si, Gyeonggi-do (KR)

(72) Inventors: Sachin Kumar Agrawal, Ghaziabad (IN); Manish Hira, Delhi (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 13/853,529

(22) Filed: Mar. 29, 2013

(65) Prior Publication Data

US 2013/0260685 A1  Oct. 3, 2013

(30) Foreign Application Priority Data

Mar. 29, 2012  (IN) .............................. 954/DEL/2012

(51) Int. Cl.
  *H04B 5/00*  (2006.01)
  *H04B 1/00*  (2006.01)
  *H04B 7/00*  (2006.01)

(52) U.S. Cl.
  CPC .................................. *H04B 5/0031* (2013.01)

(58) Field of Classification Search
  USPC .................................................. 455/41.1, 70
  See application file for complete search history.

(56) References Cited

U.S. PATENT DOCUMENTS

| | | | |
|---|---|---|---|
| 6,323,788 B1 * | 11/2001 | Kim et al. | ........................ 341/81 |
| 6,493,815 B1 | 12/2002 | Kim et al. | |
| 7,945,780 B1 | 5/2011 | Flynn et al. | |
| 7,995,667 B2 | 8/2011 | Hansen et al. | |
| 8,051,037 B2 | 11/2011 | Xia et al. | |
| 2002/0044612 A1 * | 4/2002 | Sipola | ........................... 375/295 |
| 2003/0105913 A1 | 6/2003 | Lee | |
| 2005/0039106 A1 | 2/2005 | Lee | |
| 2006/0224519 A1 | 10/2006 | Ahn | |
| 2006/0250944 A1 | 11/2006 | Hong et al. | |
| 2007/0223572 A1 | 9/2007 | Xia et al. | |
| 2009/0193300 A1 | 7/2009 | Xia et al. | |
| 2010/0040233 A1 | 2/2010 | Ganapathy | |
| 2010/0222021 A1 | 9/2010 | Balsan et al. | |

(Continued)

FOREIGN PATENT DOCUMENTS

| KR | 10-2000-0042786 A | 7/2000 |
|---|---|---|
| KR | 10-2000-0044277 A | 7/2000 |

(Continued)

*Primary Examiner* — Nguyen Vo
(74) *Attorney, Agent, or Firm* — Jefferson IP Law, LLP

(57) ABSTRACT

A method for facilitating a secured data transmission in near field communication is provided. The method includes dynamically interleaving data to be transmitted, using randomization and transmitting the dynamically interleaved data and the interleaved settings/parameters to the destination. Further, a receiver device performs dynamic de-interleaving of received data using the received interleaved settings/parameters. Further, in order to ensure security to the data transmission, the system may use Random Skip Count (RSC) values. If necessary, new dynamic interleaving settings/parameters are calculated based on an RSC value and the new settings/parameters are used to dynamically interleave the data. The process of interleaving can be performed in 2-dimensional or 3-dimensional formats. Further, in the 2-dimensional and 3-dimensional interleaving schemes, data can be first dynamically interleaved in the form of sub matrices and the sub matrices can be further dynamically interleaved to form the final dynamically interleaved data matrix.

12 Claims, 31 Drawing Sheets

(56) References Cited

U.S. PATENT DOCUMENTS

| | | |
|---|---|---|
| 2010/0299527 A1 | 11/2010 | Arunan et al. |
| 2010/0325425 A1 | 12/2010 | Park et al. |
| 2010/0328043 A1 | 12/2010 | Jantunen et al. |
| 2011/0002323 A1* | 1/2011 | Siaud et al. ............... 370/345 |
| 2011/0039494 A1 | 2/2011 | Shon et al. |
| 2011/0040757 A1 | 2/2011 | Kossi et al. |
| 2012/0275539 A1* | 11/2012 | Maltsev et al. ............. 375/295 |

FOREIGN PATENT DOCUMENTS

| | | |
|---|---|---|
| KR | 10-0377198 B1 | 3/2003 |
| KR | 10-2003-0067934 A | 8/2003 |
| KR | 10-2010-0114507 A | 10/2010 |
| KR | 10-2010-0136255 A | 12/2010 |

* cited by examiner

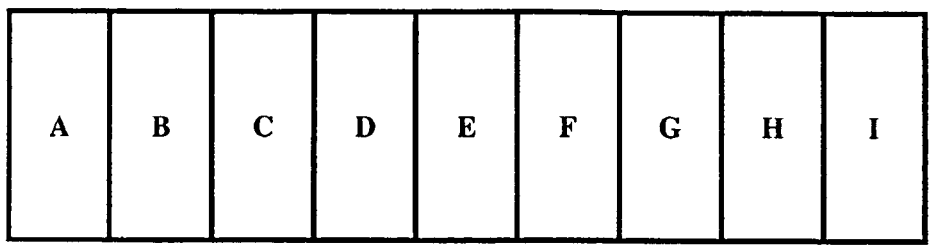
Fig. 31.a
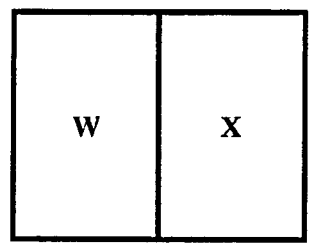
Fig. 31.b
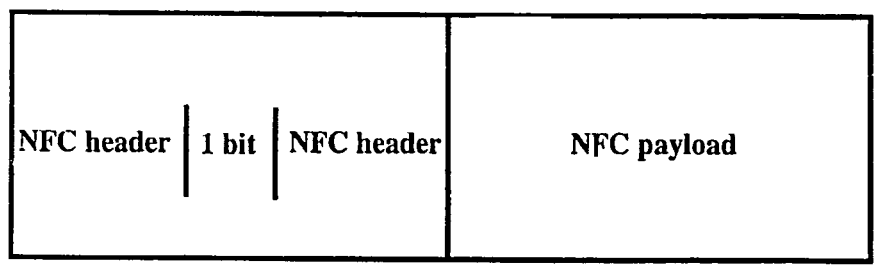
Fig. 31.c

NEAR FIELD COMMUNICATION METHOD AND APPARATUS THEREOF

PRIORITY

This application claims the benefit under 35 U.S.C. §119 (a) of an Indian patent application filed on Mar. 29, 2012 in the Indian Patent Office and assigned Serial No. 954/DEL/2012, the entire disclosure of which is hereby incorporated by reference.

BACKGROUND OF INVENTION

1. Field of the Invention

The present invention relates to the field of storage systems. More particularly, the present invention relates to transaction recovery in storage systems.

2. Description of the Related Art

Near Field Communication (NFC) is a technique that helps devices such as mobile phones establish radio communication by bringing the devices into close proximity. NFC facilitates various applications such as contactless transactions, data exchange, Radio Frequency Identification (RFID) tag scanning, mobile payments, and so on. Further, NFC enabled handsets can be used to view real time travel information and to purchase transport tickets. Further, the NFC communication is based on RFID standards. Mobile devices are equipped with NFC chips that are capable of sending encrypted data over a small distance. An NFC system normally has an initiator and a target. The initiator generates a Radio Frequency (RF) field that triggers the passive target. The NFC targets normally take the form of tags, stickers, cards, etc. that can store information and do not require a battery to operate.

However, NFC also has certain disadvantages. For example, the RF signal used in the NFC communication can be picked up using an antenna. This can be further decoded which may result in loss of sensitive information. Further, the data transmitted using NFC communication may be destroyed using a suitable device such as RFID jammer. Further, the NFC communication is prone to data modification attacks if not transmitted without proper modulation. Further, when NFC is used for making contactless payments, it may happen that the money could be duplicated. In another case, money may be transferred to another person in turn causing loss of money.

Another disadvantage of the NFC based communication is that it is prone to a man-in-the-middle attack. In this case, an attacker can make independent connections with the NFC users and can control transaction of messages and/or data between the NFC enabled user devices. This kind of attack can critically affect the NFC transactions and security because the data, such as transaction id, password, and so on, get compromised to an unauthorized third party user.

Existing systems use a method of data interleaving for ensuring security in the NFC based transaction systems. Interleaving permits arrangement of data in specific formats. Further, the receiver may de-interleave the information using information on how the data is arranged in the interleaved format. One disadvantage associated with these systems is that a third party may still decode the information after identifying the format in which the data is interleaved.

An existing method for secured data transmission discloses a process of interleaving rows and columns of the interleaved matrix separately. The method ensures secured data transmission by using distinct interleaving sequences. A disadvantage of this method is that it does not provide any mechanism for dynamically changing the interleaving sequence in case of an attack. This may affect the security of the system and may result in data loss.

Accordingly, due to the aforementioned reasons, there is a need to have a method for ensuring data security in NFC communications. Also, the method should be reliable and highly precise to prevent data loss and data leakage.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a secured Near Field Communication (NFC) communication between user devices.

Another aspect of the present invention is to improve security in NFC communication by implementing dynamic interleaving using randomization.

Another aspect of the present invention is to improve security in data transmission using Random Sequence Count (RSC) based mechanism.

In accordance with an aspect of the present invention, a method for facilitating a secure near field communication between a first device and a second device is provided. The method includes, by the first device from which information is to be transmitted to the second device, dynamically interleaving information to be transmitted using a randomization technique. Further, the first device transmits the dynamically interleaved data to the second device. The first device also transmits dynamically interleaved settings to the second device. Further, upon receiving the dynamically interleaved data and settings from first device, the second device de-interleaves received data.

In accordance with another aspect of the present invention, a system for facilitating a secure near field communication between a first device and a second device is provided. In this system, the first device, from which information is to be transmitted to the second device, dynamically interleaves the information to be transmitted using a randomization technique. Further, the first device transmits the dynamically interleaved data to the second device. The first device also transmits dynamically interleaved settings to the second device. Further, upon receiving the dynamically interleaved data and settings from first device, the second device de-interleaves received data.

In accordance with another aspect of the present invention, a device for facilitating a secure near field communication with a second device in a communication network is provided. Here, the device dynamically interleaves the information to be transmitted, using a randomization technique. Further, the device transmits the dynamically interleaved data to the second device. The device also transmits dynamically interleaved settings to the second device. Further, upon receiving the dynamically interleaved data and settings from the device, the second device de-interleaves received data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 31A, 31B and 31C illustrate settings/parameters 1, settings/parameters 2 and single bit representation of dynamic interleaving in NFC Data Exchange Format (NDEF) format respectively according to exemplary embodiments of the present invention.

Throughout the drawings, it should be noted that like reference numbers are used to depict the same or similar elements, features, and structures.

DETAILED DESCRIPTION OF EXEMPLARY EMBODIMENTS

Figure 1:
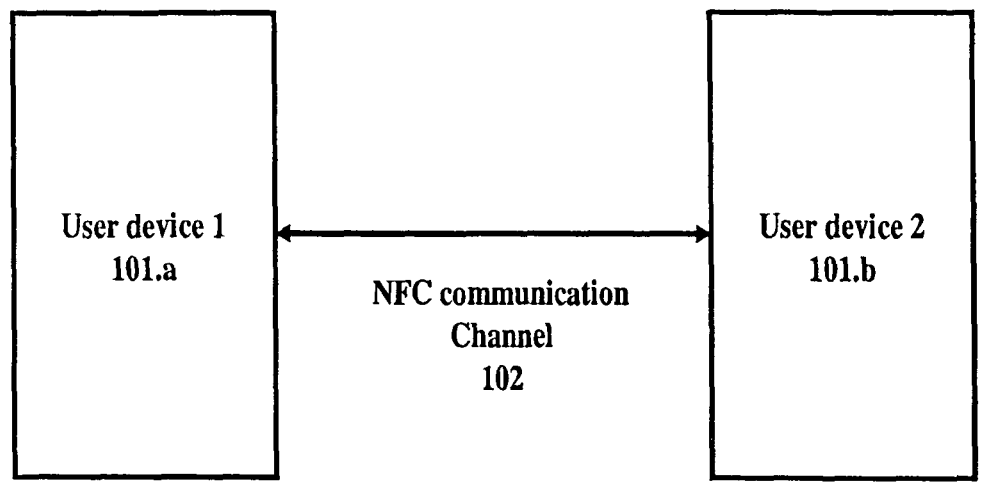
FIG. 1 illustrates a general block diagram of a Near Field Communication (NFC) system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In additions, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The exemplary embodiments described herein achieve a secured Near Field Communication (NFC) system by dynamically interleaving data using a randomizer Referring now to the drawings, and more particularly to FIGS. 1 through 31, where similar reference characters denote corresponding features consistently throughout the figures, there are shown exemplary embodiments.

FIG. 1 illustrates a general block diagram of an NFC communication system according to an exemplary embodiment of the present invention.

Referring to FIG. 1, the NFC system comprises a user device 101.a, a user device 101.b and an NFC communication channel 102. The user devices 101.a and 101.b are to be NFC enabled devices in order to communicate using an NFC medium. The NFC mechanism helps to establish radio communication between the NFC enabled user devices 101.a and 101.b. Further, the NFC enabled user devices 101.a and 101.b can perform functions like contactless payments, access systems, contactless communication with virtual data storage systems, and so on.

The exemplary system enables secured data communication by implementing a randomizer based dynamic interleaving mechanism. In this exemplary system, data to be transmitted using NFC is interleaved in a specific format. Further, the interleaved data is sent to the destination device. The transmitter device also sends dynamic interleaving settings that are used for interleaving the data, to the destination device through secured channel or by having a Certificate Authority (CA). In one exemplary embodiment, the dynamically interleaved data and dynamic interleaving settings can be sent to the destination user device 101.b using the same NFC communication channel 102. In another exemplary embodiment, the dynamically interleaved data and dynamic interleaving settings can be sent to the destination user device 101.b through different channels. Use of separate communication channels for data transmission can increase the security of the data transmission.

Further, the dynamic interleaving can be performed in 2-dimensional and/or 3-dimensional models. In a 2-dimensional model, the data/message to be transmitted using NFC can be arranged in a 2-dimensional fashion, for example, in the form of Rows and Columns in a matrix. In this case, the system has to calculate parameters such as number of rows (m), number of columns (n), data filling/releasing format, Random Row (Dm)/column Selection for filling the matrix, Random Column (Dn)/Row Selection for releasing the data from matrix, and so on for arranging the data in matrix form accordingly. In the 3-dimensional model, one additional parameter called level (l) is introduced for the third dimension layer. In this case, the data is arranged in rows and columns in each layer of the matrix. For this, the system calculates the number of layers (l) along with n and m. Further, data filling and releasing orders also can change with the introduction of the additional parameter 1 along with the random row/column/layer selection for filling the data and random column/layer/row selection for releasing the data. For example, in a 3-dimensional matrix, data filling and/or data releasing can begin from layers. Further, using the measured/calculated interleaving parameters/interleaving settings, data is dynamically interleaved in the matrix format. Further, the dynamically interleaved data can be sent to the destination user device 101.b. The sending user device 101.a can also send the interleaving parameters/settings to the destination user device 101.b. The interleaved parameters/settings sent to the destination may include a number of columns (m), a number of rows (m), an initial clock, an Random Skip Count (RSC) value, data filling/releasing format, data filling/releasing order, and so on.

In an exemplary embodiment, the total number of bits can also be kept in the interleaved parameters/settings. In this case, only the RSC value is communicated frequently with the destination user device, and not the interleaved settings/parameters. This improves data security. In another exemplary embodiment, the sender user device 101.a and the destination user device 101.b can be paired. By pairing the user devices, settings can be set in both devices and frequent sharing of interleaved parameters/settings can be avoided, which in turn ensures better data security. In another exemplary embodiment, the sender user device 101.a can use a single bit indication to notify the destination user device 101.b that dynamic interleaving of the data is performed. Upon receiving this indication, the destination user device 101.b can use dynamic de-interleaving to recover NFC message/data in a secured manner. Further, the indication bit can be given a value 1 or 0, each indicating a corresponding state of interleaving. Upon receiving the interleaved data and interleaved parameters/settings, the destination user device 101.b can perform de-interleaving of the received data in order to obtain the original NFC message/data. In another exemplary embodiment, the dynamic interleaving system can use an RSC mechanism for improving security in data transfer. For example, in circumstances like data transfer failure or third party attack, the system calculates an RSC value using a randomizer. Further, interleaving parameters are changed as per newly calculated RSC value. For example, the RSC value can be used as a clock cycle value while calculating various interleaving parameters/settings. Values of the interleaved parameters change with a change in the RSC value. Further, the new RSC value can be transmitted to the destination user device 101.b for de-interleaving of the data. As the RSC value and hence, the interleaving parameter value can be dynamically changed, the system is able to ensure security of the transmitted data. In an exemplary embodiment, the proposed randomization based dynamic interleaving scheme can also be used for ensuring data security in other data based communication techniques in wired and/or wireless and/or optical networks.

Figure 2:
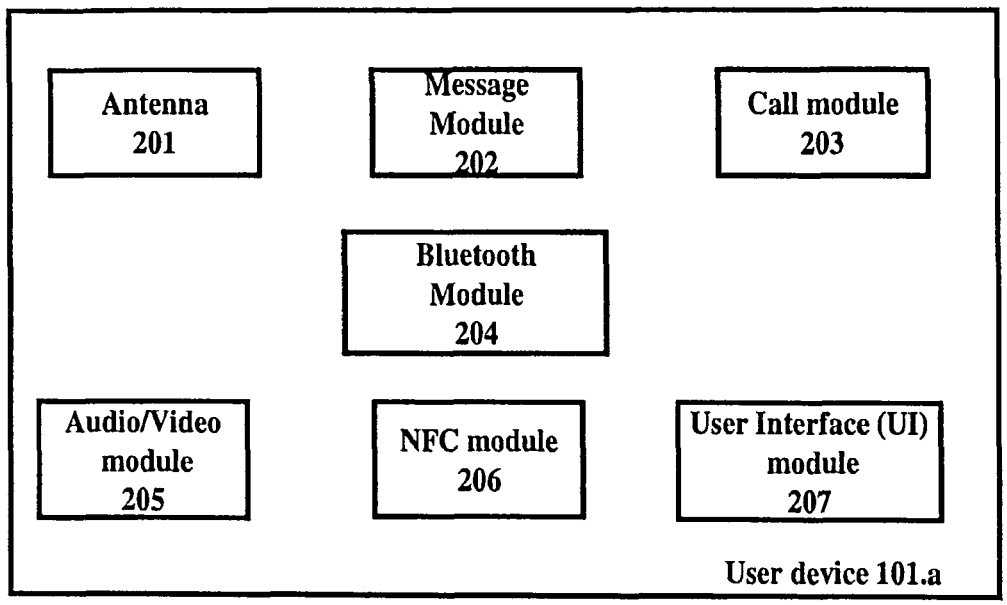
FIG. 2 illustrates a block diagram that shows various components of a user device according to an exemplary embodiment of the present invention.

FIG. 2 illustrates a block diagram that shows various components of a user device according to an exemplary embodiment of the present invention.

Referring to FIG. 2, the user device 101.a further comprises an antenna 201, a message module 202, a call module 203, a Bluetooth module 204, an audio/video module 206, an NFC module 205 and a User Interface (UI) module 207. The antenna module 201 of the user device 101 functions as transmitter and receiver to send and receive signals from and to the user device 101.a. The antenna 201 can be used to send and receive call as well as message signals. Further, the message module 202 facilitates transfer of messages from the user device 101.a. A user can type a new message and/or view a received message using the message module 202 and the user interface module 207. Further, the user can be able to create and receive various types of messages such as Short Message Service (SMS), Multimedia Message (MMS), a flash message, and so on depending on the user device compatibility.

Further, the call module 203 helps to make and receive calls of the user device 101.*a*. The user can make use of the user interface module 207 to communicate with the call module 203 to make or receive calls using the user device 101.*a*. The user can make/receive calls such as an audio call, a video call, and so on, depending on the user device 101.*a* and network compatibility.

Further, the Bluetooth module 204 enables connection and communication between user devices that support similar technology. Bluetooth technology can be used for applications such as data transfer, remote data access, and so on between user devices.

The audio/video module 205 acts as an audio/video interface that delivers audio as well as video contents to the user. The audio/video module 205 can comprise devices such as speakers, microphones, a screen, and so on that help to deliver audio/video contents to the user.

The NFC module 206 facilitates NFC based communication between the user device 101.*a* and other NFC enabled devices. NFC operates based on a Radio Frequency Identification (RFID) mechanism and can support applications such as contactless payments, tag reading, and so on. An exemplary system enables secured data communication by incorporating a randomization based dynamic interleaving scheme with the NFC module 206. Using the dynamic interleaving scheme, the NFC module 206 interleaves the NFC message to be transmitted, in a specific format, and transmits to the destination user device 101.*b*. The NFC module 206 can also use certain mechanisms such as RSC to improve data security in transmission of the NFC message.

Figure 3:
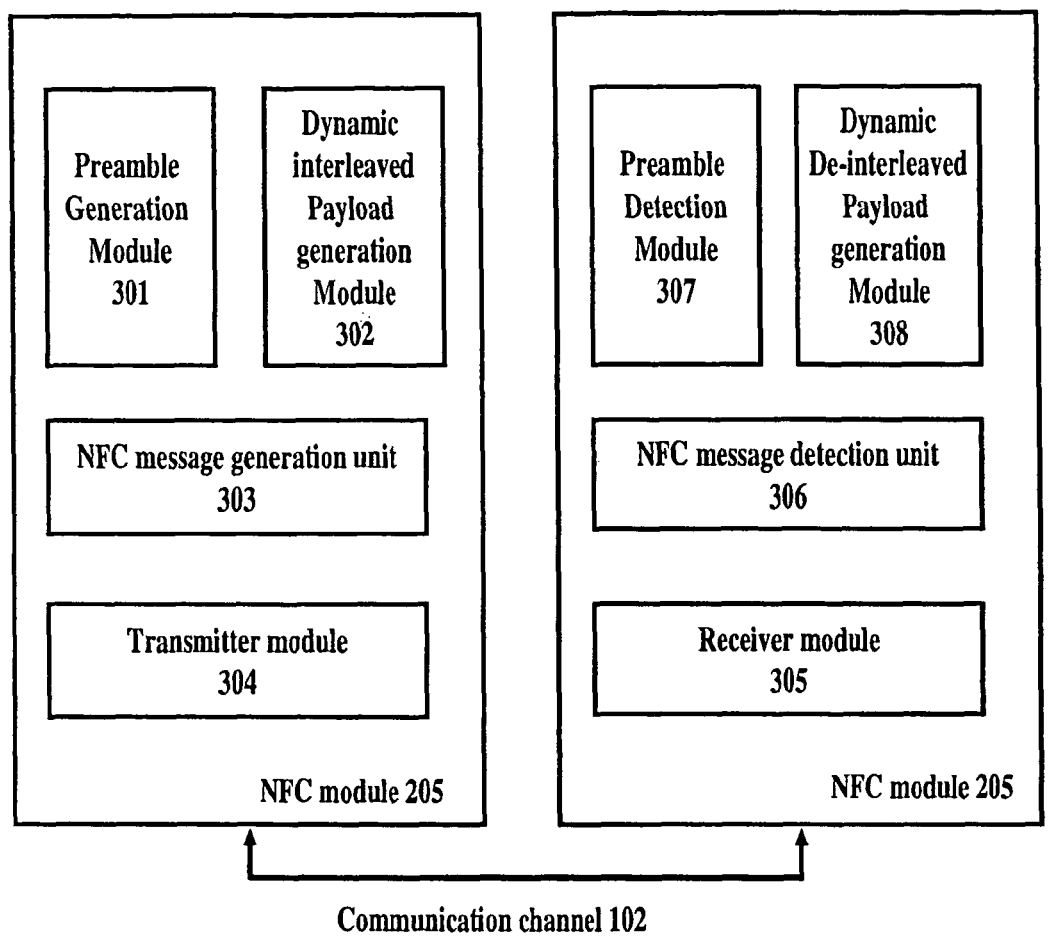
FIG. 3 illustrates a block diagram that shows various components of an NFC module according to an exemplary embodiment of the present invention.

FIG. 3 illustrates a block diagram that shows various components of an NFC module according to an exemplary embodiment of the present invention.

Referring to FIG. 3, the NFC module 205 further comprises a preamble generation module 301, a dynamic interleaved payload generation module 302, an NFC message generation unit 303, a transmitter module 304, a receiver module 305, an NFC message detection unit 306, a preamble detection module 307, and a dynamic de-interleaved payload generation module 308.

The preamble generation module 301 generates a preamble of the NFC message to be transmitted. The preamble part of the message can be used to obtain synchronization between the transmitted and received messages. An example of the preamble of a message can be a header of the message. Further, the length of the preamble affects packet overhead of the message and can accordingly affect transmission time of the message.

Further, the dynamic interleaved payload generation module 302 is responsible for generating dynamically interleaved payload data. The dynamic interleaved payload generation module 302 implements a dynamic interleaving mechanism in order to ensure security in the NFC data transfer. Using the dynamic interleaving mechanism, the dynamic interleaved payload generation module 302 interleaves the data to be transmitted into a specific format using a randomization technique. In an exemplary embodiment, the dynamic interleaved payload generation module 302 can use an RSC mechanism to ensure additional data security. Further, the dynamic interleaved payload generation module 302 is capable of dynamically changing interleaving parameters/settings values based on a calculated RSC value. By virtue of dynamic interleaving mechanism, the dynamic interleaved payload generation module 302 can safeguard the data at the time of any attack or communication failure or hacking.

Further, the NFC message generation unit 303 generates the NFC message to be transmitted to a destination user device 101.*b*. The NFC message can be generated by arranging in order the preamble and the dynamically interleaved payload in a particular sequence as specified by the communication protocol used for data transmission between the user devices 101.*a* and 101.*b*.

Further, the transmitter module 304 transmits the NFC message generated by the NFC message generation unit 303. Further, the transmitter module 304 also transmits interleaved settings/parameters to the destination user device 101.*b*. In an exemplary embodiment, the transmitter module 304 can transmit the NFC message and the interleaved parameters/settings using the same communication channel 102 at a different time. In another exemplary embodiment, the transmitter module 304 can transmit the interleaved parameters/settings through different secured channels 102. Further, the transmitter module 304 can transmit the NFC message and interleaved parameters/settings using a wireless and/or wired NFC communication channel 102. The data transmission can also take place through an authorized CA.

The receiver module 305 that is located in the destination user device 101.*b* receives the dynamically interleaved data and/or the interleaved parameters/settings transmitted by the transmitter module 304 located in the sending device 101.*a*. Further, the preamble detection module 307 processes the received interleaved information and detects the preamble in the received NFC message.

Further, the NFC message is passed onto the dynamic de-interleaved payload generation module 308. The dynamic de-interleaved payload generation module 308 performs de-interleaving of the received NFC message to identify the payload data. The dynamic de-interleaved payload generation module 308 can use the interleaved parameters/settings received from the transmitter module 304 of the sending device 101.*a*. Using the interleaved parameters/settings, the dynamic de-interleaved payload generation module 308 perform de-interleaving of the received NFC message. In an exemplary embodiment, if the dynamic interleaved payload generation module 302 makes any dynamic change to the interleaved parameters/settings, the dynamic de-interleaved payload generation module 308 is notified of the changes and is provided with the new interleaved parameters/settings. Further, the dynamic de-interleaved payload generation module 308 can perform de-interleaving of the received NFC message using the new interleaved parameters/settings.

Further, the NFC message detection unit 306 constructs the original NFC message. The NFC message detection unit 306 receives a preamble from the preamble detection module 307 and the dynamically de-interleaved payload information from the dynamic de-interleaved payload generation module 308. Further, the NFC message detection unit 306 processes the received information and constructs the original NFC message.

Figure 4:
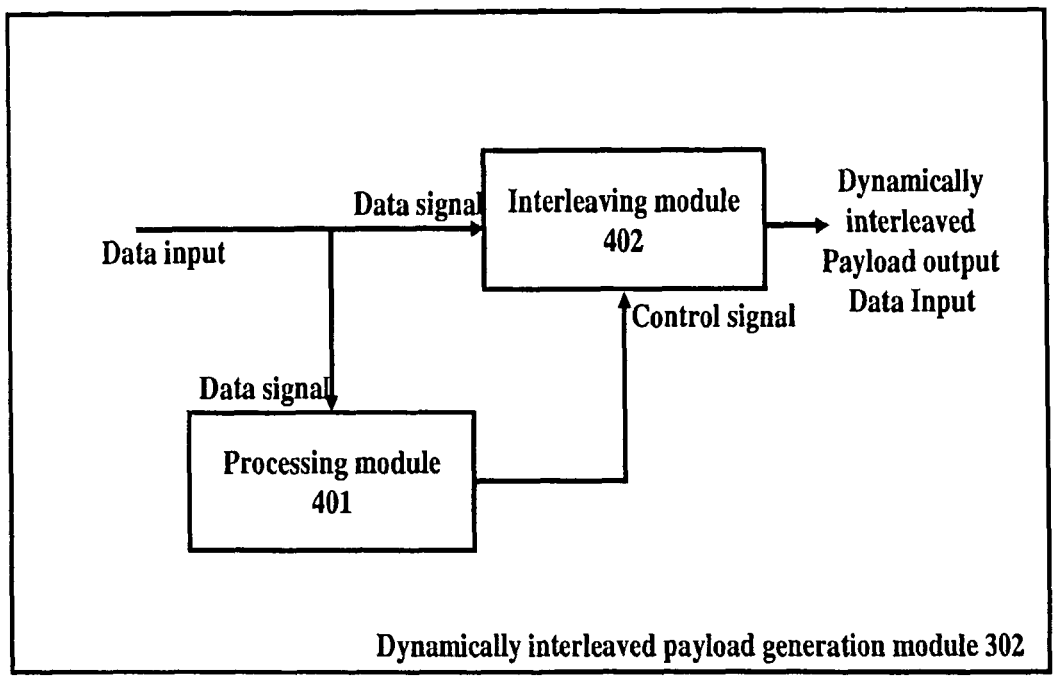
FIG. 4 illustrates a block diagram that shows various components of a proposed dynamically interleaved payload generation module according to an exemplary embodiment of the present invention.

FIG. 4 illustrates a block diagram that shows various components of a dynamically interleaved payload generation module according to an exemplary embodiment of the present invention.

Referring to FIG. 4, the dynamically interleaved payload generation module 302 further comprises a processing module 401 and an interleaving module 402. The interleaving module 402 requires two inputs, such as data input and a control signal, to perform interleaving of the data to be transmitted.

The control signal is generated by the processing module 401. The control signal can comprise data such as a number of columns, a number of rows, a number of levels, a data filling format, a data filling/releasing order, and so on, which are required for interleaving the data to be transmitted. Further, in order to generate the control signal, the processing module 401 receives data to be transmitted as input. The processing module 401 calculates values of various control signal parameters using randomizers. The randomizers also help the processing module to dynamically change values of various control signal parameters in case of any attack and/or data delivery failure. In an exemplary embodiment, the processing module can make use of an RSC mechanism in order to change the interleaved parameters/settings dynamically. The system calculates the RSC value and uses the calculated value as a clock value for calculating the control signal parameters.

Further, the control signal is fed as an input to the interleaving module 402. The interleaving module 402 also fetches the data to be interleaved as an input parameter. Further, the interleaving module 402 interleaves the data based on the values of different control signal parameters. For example, if the number of rows and the number of columns are calculated as 2 and 3 respectively, the interleaving module 402 can interleave the data in the form of a 2*3 matrix. Further, the interleaving module 402 can also consider parameters such as data filling format, data filling/releasing order, RSC value, and so on while interleaving the data. Once the data is interleaved based on the control signal parameter values, the interleaved data can be placed in the payload section of the NFC message and can be transmitted to the destination user device 101.*b*.

Figure 5:
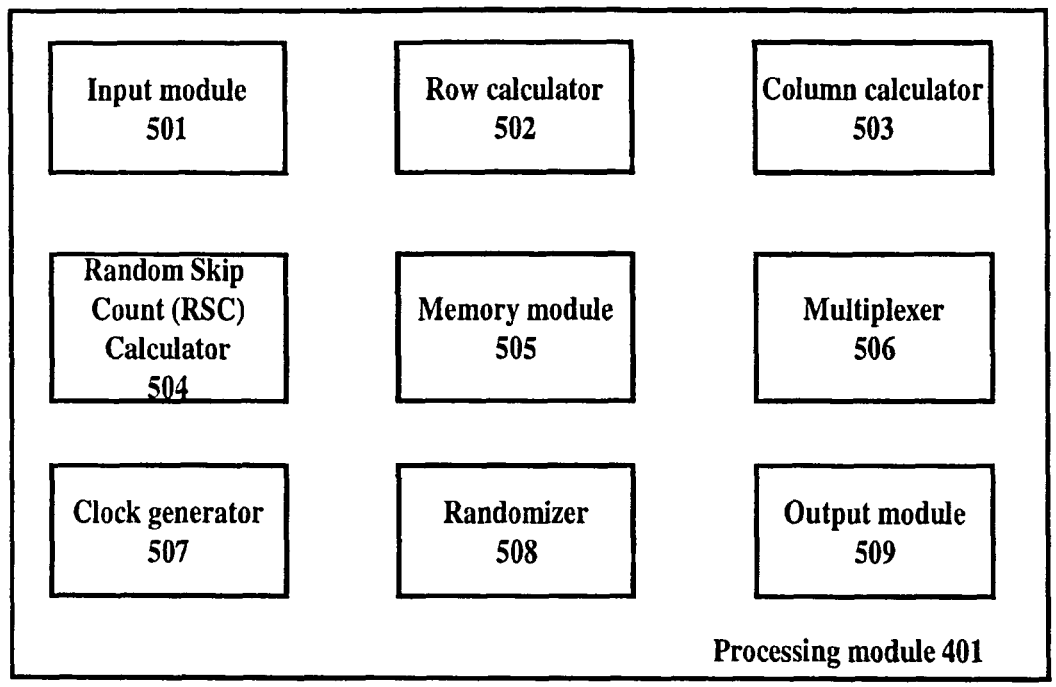
FIG. 5 illustrates a block diagram that shows various components of a processing module according to an exemplary embodiment of the present invention.

FIG. 5 illustrates a block diagram that shows various components of a processing module according to an exemplary embodiment of the present invention.

Referring to FIG. 5, the processing module 401 further comprises an input module 501, a row calculator 502, a column calculator 503, an RSC calculator 504, a memory module 505, a multiplexer 506, a clock generator 507, a randomizer 508 and an output module 509. The input module 501 receives input for calculating the control signal. The input for calculating the control signal is the data input that is to be interleaved. The input data can be fed to the input module 501 through wired and/or wireless means.

The row calculator 502 calculates the number of rows in the matrix in which the data is to be interleaved. In an exemplary embodiment, the row calculator can use a randomizer 508 or an equation to calculate the number of rows (m). In another exemplary embodiment, if for a 2 dimensional matrix, the number of columns (n) is calculated using a randomizer 508, then the row calculator 502 calculates the number of rows (m) using the equation. In another exemplary embodiment, if for the 2-dimensional matrix, the number of columns (n) is to be calculated using an equation, then the row calculator 502 calculates the number of rows (m) using randomizer. For example, the row calculator 502 can calculate the number of rows (m) for a 2-dimensional matrix using Equation (1):

$$m=(N/n) \quad \text{Equation (1)}$$

where, m=number of rows

N=total number of bits in the message n=number of columns

In another exemplary embodiment, the row calculator 502 can calculate the number of rows using a randomizer 508. For example, the row calculator 502 can use a first randomizer to calculate the number of rows to be present in the matrix. In this case, a random bit sequence is fed as input to the first randomizer 508. Further the row calculator 502 produces a clock pulse using a clock generator 507. Further, using the generated clock pulse, the row calculator performs a clock shift of the random bit sequence present in the first randomizer. Further, a certain number of bits present in a pre-decided location in the randomizer bit sequence is fetched and is compared with a pre-stored database. In an exemplary embodiment, the database with which the bits fetched from the randomizer are compared can be a Look Up Table (LUT). Further, the LUT can be comprised of a number of rows (m) corresponding to a combination of fetched bits. For example, if the fetched bits are 00, then the corresponding number of rows can be 1, and so on.

The column calculator 503 calculates the number of columns in the matrix in which the data is to be interleaved. In an exemplary embodiment, the column calculator 503 can calculate the number of columns (n) using a randomizer 508. In another exemplary embodiment, the column calculator 503 can calculate the number of columns (n) using a suitable equation. For example, if for a 2-dimensional matrix, the number of rows (m) is to be calculated using an equation, then the column calculator 503 calculates the number of columns (n) using a randomizer 508. For example, the column calculator 503 can use a first randomizer to calculate the number of columns to be present in the matrix. In this case, a random bit sequence is fed as input to the first randomizer 508. Further the column calculator 503 produces a clock pulse using a clock generator 507. Further, using the generated clock pulse, the column calculator 503 performs a clock shift of the random bit sequence present in the first randomizer. Further, a certain number of bits present in a pre-decided location in the randomizer bit sequence are fetched and are compared with a pre-stored database, which can be an LUT. Further, the LUT can be comprised of a number of columns (n) corresponding to a combination of fetched bits. For example, if the fetched bits are 00, then the corresponding number of columns can be 1, and so on. In another exemplary embodiment, for the 2-dimensional matrix, if the number of rows (m) is calculated using a randomizer 508, then the column calculator 503 calculates the number of columns (n) using a suitable equation.

The dynamic interleaving mechanism as in the proposed system uses an RSC sequence to ensure security in data transmission. The RSC value is calculated by the random skip count calculator 504. The random skip count calculator 504 can calculate an RSC value using a randomizer 508. In order to calculate a random skip count value using a randomizer 508, a random bit sequence of 8 bits is fed as input to the randomizer 508. Further, using a clock pulse generated by a clock generator 507, the random skip count calculator 504 performs a clock shift of the random bit sequence present in the randomizer 508. In one exemplary embodiment, a decimal equivalent of the 8 bit sequence can be used as count (count_D). In another exemplary embodiment, a certain numbers of bits present in a pre-decided location in the randomizer bit sequence can be fetched and compared with a pre-stored database, which can be an LUT. For example, if the fetched bits are 00, then a corresponding number of columns can be 1 and so on. The calculated RSC value is then used as a clock shift value in the clock generator 507 for calculating parameters such as a number of rows (m), a number of columns (n), a data filling format, a data filling/releasing order, and so on. That means, the clocks of the randomizers used for calculating values of parameters such as the number of rows (m), the number of columns (n), the data filling format, the data filling/releasing order, and so on are shifted according to the calculated Count_D value. In various exemplary embodiments, the shifted value/RSC can be communicated with the other receiving device either through a secured channel or through the same channel with a different time slot. If CA is used as an intermediate authority, in this case through CA the RSC value shall be shared.

Random Skip Count=Decimal Equivalent Count=Shifting Existing clocks of the randomizers (shift registers).

The memory module 505 can comprise databases or LUTs so as to calculate parameters such as a number of columns (n), a number of rows (m), a data filling format, a data filling/releasing order, and so on.

The multiplexer 506 can be used to multiplex various parameters such as a number of columns (n), a number of rows (m), a data filling format, a data filling/releasing order, and so on to a single signal for the ease of transmission. For example, the parameters such as the number of columns (n), the number of rows (m), the data filling format, the data filling/releasing order, and so on are multiplexed to form a control signal. Further, the multiplexed signal can be transmitted to a destination using a single channel.

The control signal formed by multiplexing various parameters is then delivered to a communication channel using the output module 509. The output module 509 can transmit the control signal data to the interleaving module 402. The interleaving parameters can be shared with the interleaving module 402 using serial or parallel communication and the communication can happen through a secured channel 102 or through an authorized authority such as CA. Further, the interleaving parameters can be shared with the dynamic de-interleaved payload generation module 308 of the receiver device using a wired/wireless channel via serial or parallel communication.

Figure 6:
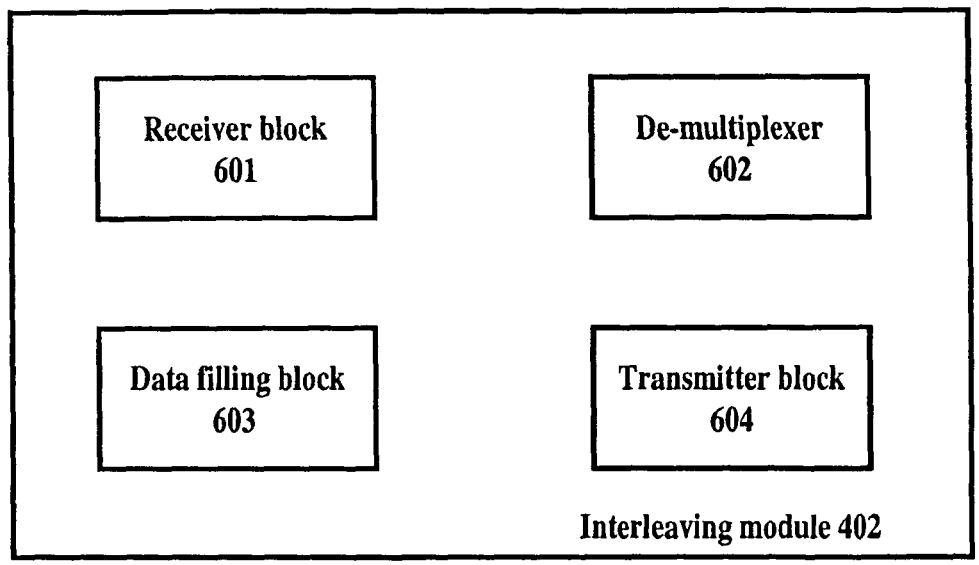
FIG. 6 illustrates a block diagram that shows various components of an interleaving module according to an exemplary embodiment of the present invention.

FIG. 6 illustrates a block diagram that shows various components of an interleaving module according to an exemplary embodiment of the present invention.

Referring to FIG. 6, the interleaving module 402 further comprises a receiver block 601, a de-multiplexer 602, a data filling block 603 and a transmitter block 604. The receiver block 601 receives the control signal transmitted from the processing module 401. The receiver block 601 also receives the data signal to be interleaved as an input parameter. The control signal is then fed to the de-multiplexer 602. The de-multiplexer 602 de-multiplexes the control signal and retrieves the control signal parameters such as the number of columns (n), the number of rows (m), the data filling format, the data filling/releasing order, and so on, based on which the data is to be interleaved.

The data filling block 603 analyzes the control signal parameters and identifies values of each parameter. Further, based on the identified value of the control signal parameters, the data filling block 603 performs data interleaving. For example, consider the value of various control signal parameters as given below:

Number of columns (n)=3
Number of rows (m)=2
Data filling format=Row wise filling, column wise outing
Data filling order=fill row 1 first
Data releasing order=release from column 2 first In this case, the data filling module 603 interleaves the data to be transmitted into a 2*3 matrix format. In this case, the system adopts a row wise filling format to perform row wise filling from a 1st row. Further, while de-interleaving the data, data releasing is started from a 2nd column. In an exemplary embodiment, in case of any attack and/or data failure, the RSC calculator 504 in processing module 401 generates an RSC value and the control signal parameters are changed according to the RSC value. In this case, the changes in control signal parameters are updated at the interleaving module 402 and accordingly the data filling block 603 performs interleaving of the data. Further, the transmitter block 604 transmits the interleaved data to a destination user device 101.b.

Figure 7A:
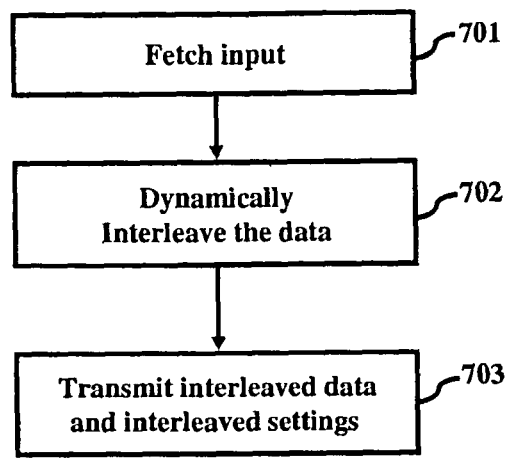
FIG. 7A and FIG. 7B illustrate flow diagrams that show various steps involved in a process of dynamic interleaving and dynamic de-interleaving of data according to exemplary embodiments of the present invention.
Figure 7B:
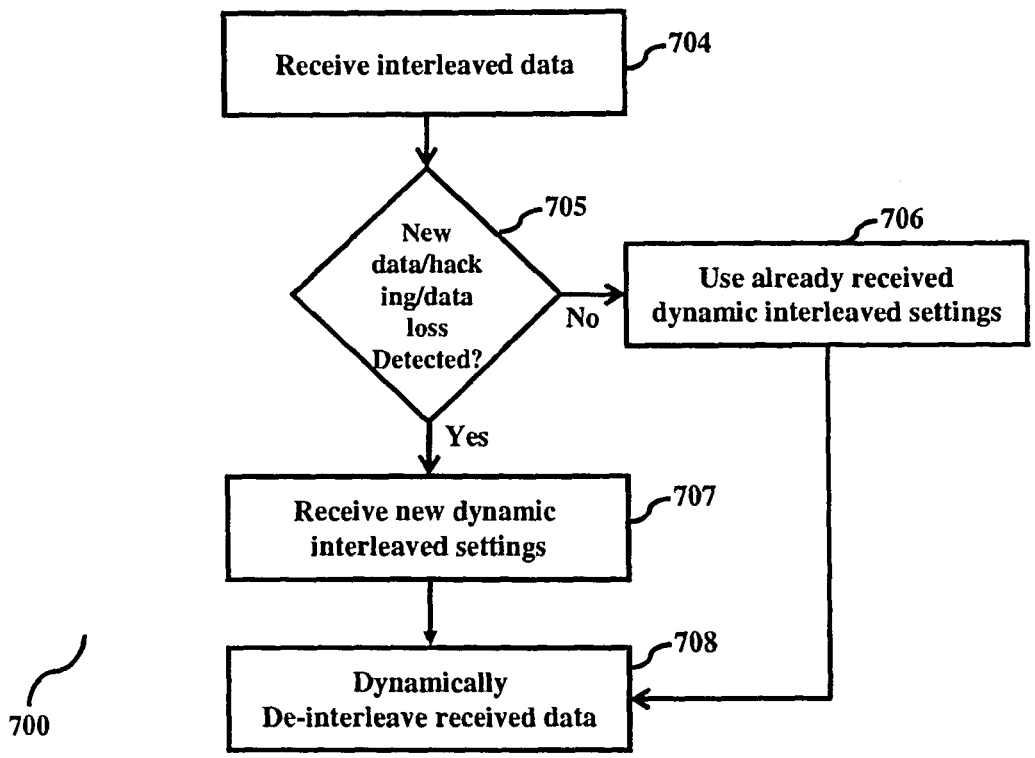

FIG. 7A and FIG. 7B illustrate flow diagrams that show various steps involved in a process of dynamic interleaving and dynamic de-interleaving of data according to exemplary embodiments of the present invention.

Referring to FIG. 7A and FIG. 7B, in order to permit secured transmission of the data, the data to be transmitted is fetched in step 701 by the dynamically interleaved payload generation module 302. Further, the dynamically interleaved payload generation module 302 performs in step 702 dynamic interleaving of the data. In an exemplary embodiment, the dynamically interleaved payload generation module 302 can calculate and use an RSC value in order to perform dynamic interleaving at times of attack and/or data delivery failure or hacking, to ensure data security. Further, dynamic interleaving of data is performed by using randomization of data. Further, the dynamic interleaved data is transmitted in step 703 to the destination user device 101.b using the transmitter module 304 in the sender user device 101.a. In one exemplary embodiment, the data can be dynamically interleaved either in the form of a 2-dimensional matrix or in the form of a 3-dimensional matrix. In another exemplary embodiment, the system can use dedicated randomizers for the purpose of 2D and 3D interleaving or can share same randomizers. In one exemplary embodiment, dynamic interleaving can also be done after generating the message or packet. In another exemplary embodiment, the proposed dynamic interleaving mechanism does not require the addition of any extra bits for security of the data to be transmitted. This helps to maintain the same data size even if the data is dynamically interleaved. In an exemplary embodiment, the settings are not always shared with other devices. If both devices are paired or agreed to share the data based on certain settings, the certain settings can be used for the data sharing and thus there is no need to send the settings every time with the data. In case of any attack or loss of data, the settings are shared with the receiver user device 101.b.

Further, at the receiver end, the interleaved data is received in step 704 by the receiver module 305 in the receiver user device 101.b. The receiver shall be aware that the dynamic interleaving is done after packet generation or before the packet generation. Further, the receiver checks in step 705 if the received data is new or if the data transmission is affected by hacking, data loss, or any such issues. If the received data is new or if the data transmission is affected by hacking, data loss, or any such issues, the receiver receives in step 707 new dynamic interleaved settings from the data transmitter. If not, the receiver uses in step 706 already received dynamic interleaved settings to dynamically de-interleave the received de-interleaved data. In an exemplary embodiment, the proposed mechanism does not require the NFC receiver to receive dynamic interleaved settings each time the data is transmitted. In another exemplary embodiment, the interleaving settings can be received through a different channel than channel 102 such as a secured transmission channel or through an authorized CA. Further, the channel 102 can be wired or wireless and the data transmission can be serial or parallel transmission. The dynamic interleaved data and the dynamic interleaved settings can be transmitted to the receiver user device 101.b through separate secured channels or through the same channel 102. If the settings are transmitted through the same channel 102 to the receiver, then the settings are shared at a different time level to avoid the attacks. Further, the dynamic de-interleaved payload generation module 308 present in the receiver user device 101.b performs in step 708 dynamic de-interleaving of the received data using the dynamic interleaving settings received from the transmitter user device 101.a. The various actions in method 700 may be performed in the order presented, in a different order, or simultaneously. Further, in some exemplary embodiments, some actions listed in FIG. 7 may be omitted.

Figure 8:
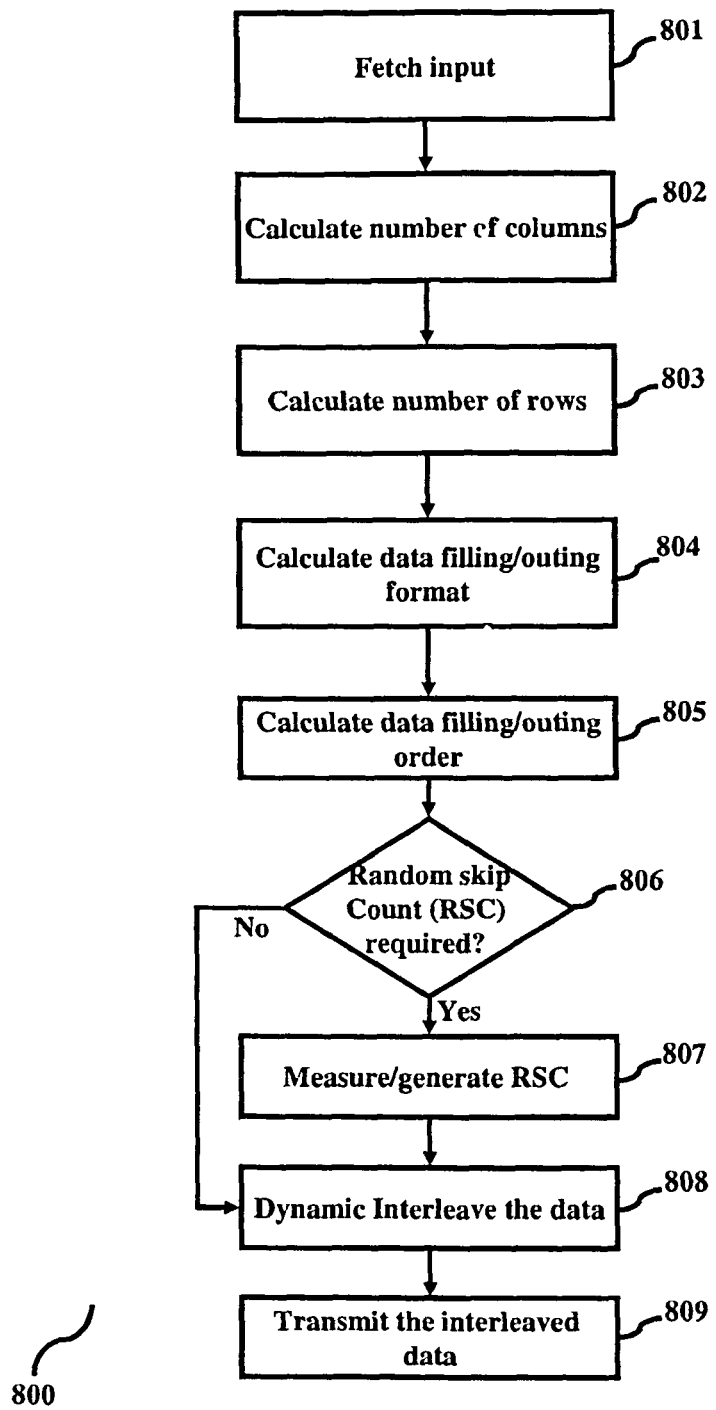
FIG. 8 illustrates a flow diagram that shows various steps involved in the process of dynamically interleaving data 2-dimensionally according to an exemplary embodiment of the present invention.

FIG. 8 illustrates a flow diagram that shows various steps involved in the process of dynamically interleaving data 2-dimensionally according to an exemplary embodiment of the present invention.

Referring to FIG. 8, in order to dynamically interleave a data stream, the Dynamic Interleaved Payload Generation Module 302 fetches in step 801 the data to be interleaved. The Dynamic Interleaved Payload Generation Module 302 comprises a processing module 401 and an interleaving module 402. The interleaving module 402 performs interleaving of the data. In order to interleave the data stream, the interleaving module 402 requires a data signal input and a control signal input. The control signal is generated by the processing module 401. In order to generate the control signal, the processing module 401 receives the data to be interleaved as its input. Further, the processing module 401 processes the received data signal and measures various control signal parameters such as a number of columns in step 802, a number of rows in step 803, a data filling/outing format in step 804, a data filling/outing order in step 805, and so on. In an exemplary embodiment, the processing module 401 measures the control signal parameters using a randomization technique using a plurality of randomizers 508. In another exemplary embodiment, the processing module 401 can use equations for measuring certain control signal parameters as given in Equation (1). In another exemplary embodiment, if the number of rows (m) is calculated using a randomizer 508, then the number of columns (n) is calculated using a suitable equation for the 2-dimensional matrix. In another exemplary embodiment, if the number of columns (n) is calculated using a randomizer 508, then the number of rows (m) is calculated using a suitable equation for the 2-dimensional randomizer. For example, if the number of columns (n) is calculated using a randomizer 508 for a 2-dimensional matrix, then the number of rows (m) can be calculated using the equation as shown in Equation (1).

Further, in order to ensure more security to the data transfer, the system also employs an RSC parameter. In order to use this, the system checks in step 806 if RSC is required for performing data interleaving. The RSC can be used for data security at the time of attack and/or data transfer failure. The initial value of RSC is zero. If RSC is required, the system measures/generates in step 807 an RSC value using a system and method to generate RSC values. If the RSC value is generated, the system calculates the settings accordingly using the clock shift based on the generated RSC value. In an exemplary embodiment, the RSC check in step 806 can be done before calculating other interleaving parameters. Further, using the various control signal parameters, the interleaving module 402 performs in step 808 dynamic interleaving of the data. In the 2-dimensional method, the data is interleaved in the form of rows and columns of a matrix. Further, the format and order in which the data is filled into the matrix form is fetched by the interleaving module 402 from the control signal.

In a 2-dimensional matrix, the data can be filled using a row wise or column wise format. Similarly, the data can be released in a column wise or row wise format. Further, the data filling order refers to the order in which the data is to be filled in the matrix. For example, if the data filling format selected is row wise filling, then the data filling order refers to which row is to be filled first. Similarly, if the data releasing format is selected as column wise outing, then the data releasing order refers to from which column in the matrix data releasing should begin. Further, after dynamically interleaving the data, the data is transmitted in step 809 to the destination user device 101.b using the transmitter block 604 present in the interleaving module 402. In an exemplary embodiment, in case of a 2-dimensional matrix, the data can be interleaved in the form of 2D sub matrices that are then used to randomize the data dynamically. The various actions in method 800 may be performed in the order presented, in a different order, or simultaneously. Further, in some exemplary embodiments, some actions listed in FIG. 8 may be omitted.

Figure 9:
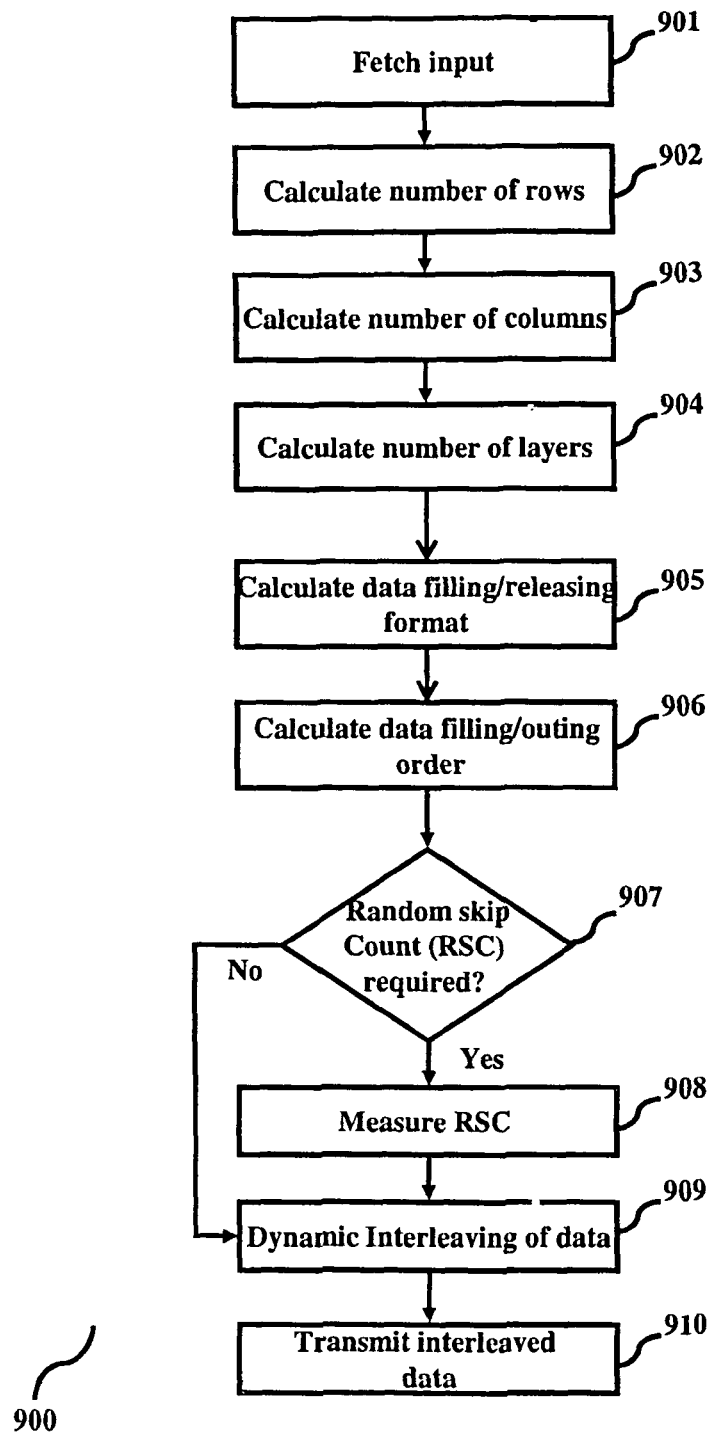
FIG. 9 illustrates a flow diagram that shows various steps involved in the process of dynamically interleaving data 3-dimensionally according to an exemplary embodiment of the present invention.

FIG. 9 illustrates a flow diagram that shows various steps involved in the process of dynamically interleaving data 3-dimensionally according to an exemplary embodiment of the present invention.

Referring to FIG. 9, in order to dynamically interleave a data stream, the Dynamic Interleaved Payload Generation Module 302 fetches in step 901 the data to be interleaved. The Dynamic Interleaved Payload Generation Module 302 comprises a processing module 401 and an interleaving module 402. The interleaving module 402 performs interleaving of the data. In order to interleave the data stream, the interleaving module 402 requires a data signal input and a control signal input. The control signal is generated by the processing module 401. In order to generate the control signal, the processing module 401 receives the data to be interleaved as its input. Further, the processing module 401 processes the received data signal and measures various control signal parameters such as a number of rows in step 902, a number of columns in step 903, a number of layers in step 904, a data filling/outing format in step 905, a data filling/outing order in step 906, and so on. In an exemplary embodiment, the processing module 401 measures the control signal parameters using a randomization technique using a plurality of randomizers 508. In another exemplary embodiment, if any two of the number of columns (n), the number of rows (m) and the number of layers (l) are calculated using randomizers, then the third parameter is calculated using a suitable equation. In another exemplary embodiment, a value of the randomizer 508 used for calculating the second parameter can be dependent on value of the randomizer 508 used for calculating the first parameter or can be independent, and the dependency can be decided considering total balance of the equation. For example, in the 3-dimensional mode of dynamic interleaving, if the number of rows (m) and the number of columns (n), then the number of layers (l) can be measured by using Equation (2):

$$l = N/(m*n) \qquad \text{Equation (2)}$$

where,
l = number of layers in the matrix
N = total number of bits
m = number of rows in the matrix
n = number of columns in the matrix The total number of bits (N) can be manually provided to the processing module 401 or can be calculated using values of the number of rows (m) and the number of columns (n). Further, in order to ensure more security to the data transfer, the system also employs an RSC parameter. In order to use this, the system checks in step 907 if RSC is required for performing data interleaving. The RSC can be used for data security at the time of attack and/or data transfer failure. If RSC is required, the system measures in step 908 an RSC value. Further, the system calculates new control signal parameters/settings based on the generated RSC value. Further, using the various control signal parameters, the interleaving module 402 performs in step 909 dynamic interleaving of the data.

In the 3-dimensional method, the data is interleaved in the form of rows and columns arranged in different layers of a matrix. Further, the format and order in which the data is filled/released into the matrix form is fetched by the interleaving module 402 from the control signal. In a 3-dimensional data interleaving format, the data filling format refers to the format in which the data is to be filled into the matrix form. For example, the data can be filled any of a row wise, a column wise or a layer wise format in a 3 dimensional matrix. Further, the data releasing format refers to the format in which the data is to be released from the matrix. For example, the data can be released column wise first followed by row by row releasing and layer by layer releasing respectively. Further, the dynamically interleaved data is transmitted in step 910 to the destination user device 101.b using the transmitter block 604 present in the interleaving module 402. After interleaving the data in the 3-dimensional format, the interleaved data is sent to the destination using the transmitter module 304. In an exemplary embodiment, the transmitter module 304 transmits the interleaved parameters/settings to the destination/receiver in advance before transmitting the data. The interleaved data and the interleaved parameters/settings can be transmitted through a single channel at different times or through different secured channels. Further, the receiving device can perform de-interleaving of the received data using the interleaved parameters/settings received from the sender user device 101.a. In an exemplary embodiment, in the 3-dimensional interleaving format, the data to be interleaved is interleaved in the form of sub matrices. Further, the sub matrices are dynamically interleaved and are sent to the destination. The various actions in method 900 may be performed in the order presented, in a different order or simultaneously. Further, in some exemplary embodiments, some actions listed in FIG. 9 may be omitted.

Figure 10:
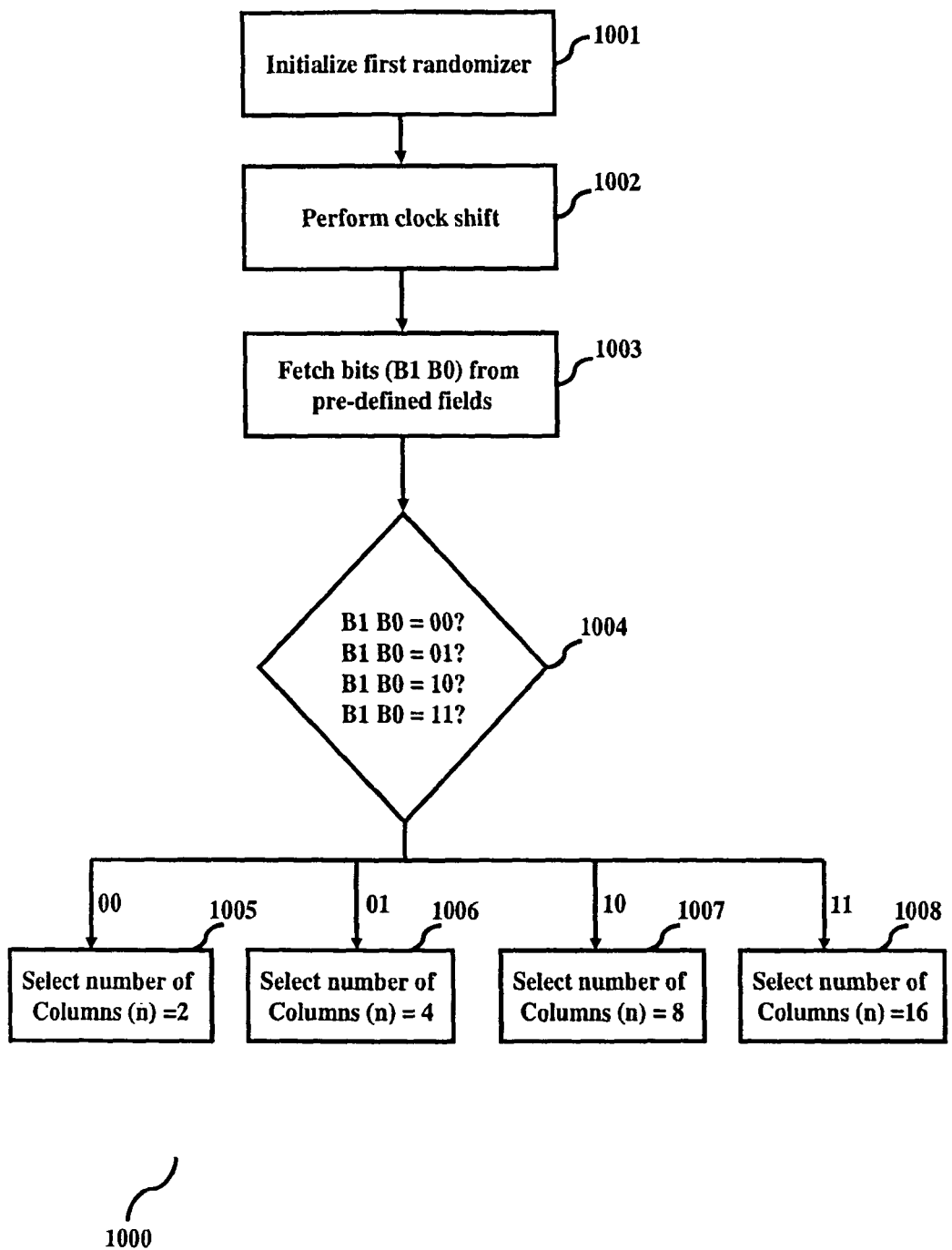
FIG. 10 illustrates a flow diagram that shows various steps involved in the process of calculating a number of columns for a 2-dimensional matrix using a randomizer according to an exemplary embodiment of the present invention.

FIG. 10 illustrates a flow diagram that shows various steps involved in the process of calculating a number of columns for a 2-dimensional matrix using a randomizer according to an exemplary embodiment of the present invention.

Referring to FIG. 10, if the number of columns is calculated using a randomizer for a 2 dimensional matrix, then the number of rows is calculated using an equation such as Equation (1). In another exemplary embodiment, if the number of rows are calculated using the randomizer, then the number of columns can be calculated using a suitable equation.

In another exemplary embodiment, the process of calculating the number of columns using a randomizer as described below can be used for calculating the number of rows if the number of columns is to be calculated using an equation for that 2-dimensional matrix, with a different LUT.

In order to calculate the number of columns for a matrix, the column calculator 503 in the processing module 401 initializes in step 1001 a first randomizer. The first randomizer 508 can be initialized using a random bit sequence. Further, the column calculator 503 performs in step 1002 a clock shift of the random bit sequence using a clock signal generated using a clock generator 507. After performing the clock shift of the bit sequence, the column calculator 503 fetches in step 1003 a certain number of bits from pre-defined fields of the randomizer 508. For example, in case of a 2-dimensional mode, the column calculator 503 fetches 2 bits (B1 B0) of data from a pre-defined field in the randomizer 508. In another example, in case of a 3-dimensional mode, the column calculator 503 can fetch 3 bits (B2 B1 B0) from pre-defined fields in the randomizer 508. Further, the column calculator 503 compares in step 1004 fetched bits with data stored in certain databases present in the memory module 505. In an exemplary embodiment, the database can comprise an LUT with the number of columns to be selected corresponding to the fetched bit sequence. For example, the number of columns to be selected corresponding to the fetched bit sequence can be selected as depicted in Table 1.

TABLE 1

| Bit Sequence (n) | Number of columns (n) |
|---|---|
| 00 | 2 |
| 01 | 4 |
| 10 | 8 |
| 11 | 16 |

Here, if the selected bits B1 B0=00, the column calculator 503 selects in step 1005 2 columns. If B1 B0=01, the column calculator 503 selects in step 1006 4 columns. Further, for B1 B0=10 and 11, the column calculator 503 selects in steps 1007 and 1008 8 and 16 columns respectively. Further, in case of any attack and/or data delivery failure, the column calculator 503 is dynamically able to change values of the column value parameter. In order to do this, the column selector 503 can use an RSC generated using a random skip count calculator 504. Further, the RSC count value can be used as a clock value to shift the bit sequence in the randomizer 508. By picking random values of RSC and by using them as the clock value for selecting the number of columns (n), the system is able to ensure more security to the data being transmitted.

In one exemplary embodiment, the number of bits selection from the randomizer 508 can be increased to provide more columns in the mapping table for lengthy data packets, where the number of columns=8, 16, 32, or more. The various actions in method 1000 may be performed in the order presented, in a different order or simultaneously. Further, in some exemplary embodiments, some actions listed in FIG. 10 may be omitted.

Figure 11:
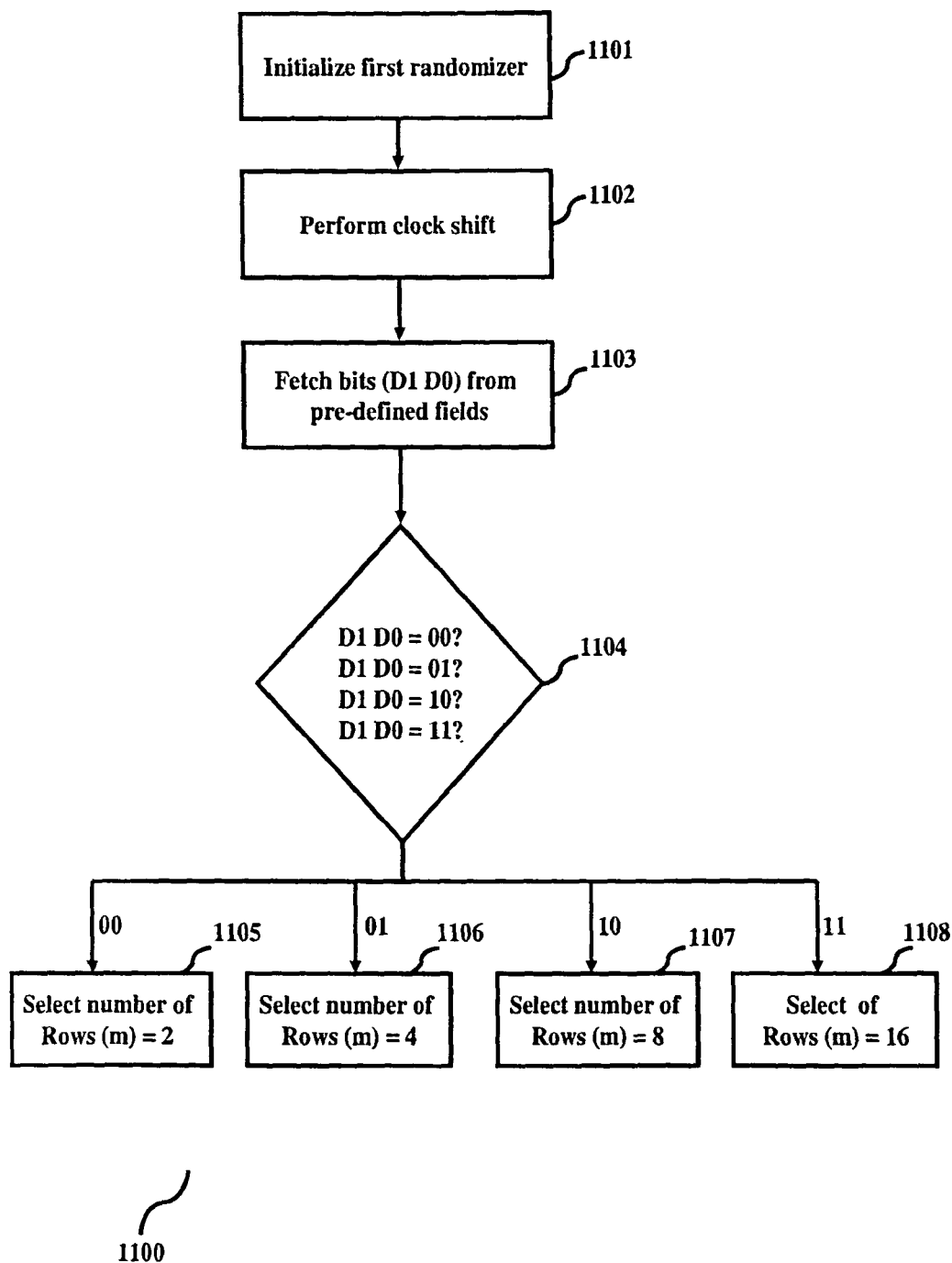
FIG. 11 illustrates a flow diagram that shows various steps involved in the process of calculating a number of rows for a 3-dimensional matrix using a randomizer according to an exemplary embodiment of the present invention.

FIG. 11 illustrates a flow diagram that shows various steps involved in the process of calculating a number of rows for a 3-dimensional matrix using a randomizer according to an exemplary embodiment of the present invention.

Referring to FIG. 11, if any two of the parameters number of rows (m), number of columns (n), number of layers (l) are calculated using a randomizer for a 3-dimensional matrix, then the third parameter is calculated using a suitable equation. For example, if for a 3-dimensional matrix, the number of rows (m) and the number of columns (n) are calculated using randomizers, then the number of layers (l) is calculated using a suitable equation, such as Equation (2). Further, in case of 3-dimensional matrix parameter calculation, the second randomizer value can be dependent on the first randomizer value or can be independent, based on overall balance of the equation.

In another exemplary embodiment, once the number of rows (m) for a 3-dimensional matrix is calculated using the process given below, then any one of the two parameters number of columns (n) and number of layers (l) can be calculated using the same method as given below.

In order to calculate the number of rows for a matrix, the row calculator 502 in the processing module 401 initializes in step 1101 a first randomizer 508. The first randomizer 508 can be initialized using a random bit sequence. Further, the row calculator 502 performs in step 1102 a clock shift of the random bit sequence using a clock signal generated using a clock generator 507. After performing the clock shift of the bit sequence, the row calculator 502 fetches in step 1103 a certain number of bits from pre-defined fields of the randomizer 508. For example, in case of 2-dimensional mode, the row calculator 502 fetches 2 bits (B1 B0) of data from a pre-defined field in the randomizer 508. In another example, in case of a 3-dimensional mode, the row calculator 502 can fetch 3 bits (B2 B1 B0) from pre-defined fields in the randomizer 508. Further, the row calculator 502 compares in step 1104 fetched bits with data stored in certain databases present in the memory module 505. In an exemplary embodiment, the database can comprise an LUT with the number of rows to be selected corresponding to the fetched bit sequence. For example, the number of rows to be selected corresponding to fetched bit sequence can be selected as depicted in Table 2.

TABLE 2

| Bit Sequence (n) | Number of rows (m) |
|---|---|
| 00 | 2 |
| 01 | 4 |
| 10 | 8 |
| 11 | 16 |

Here, if the fetched bits B1 B0=00, the row calculator 502 selects in step 1105 1 row. If the fetched bits are B1 B0=01, the row calculator 502 selects in step 1106 2 rows. Similarly, if the fetched bits are B1 B0=10, the row calculator 502 selects in step 1107 3 rows and for value of B1 B0=11, the row calculator 502 selects in step 1108 4 rows and so on. Further, in case of any attack and/or data delivery failure, the row calculator 502 is dynamically able to change values of the row value parameter. In order to do this, the row calculator 502 can use an RSC generated using a random skip count calculator 504. Further, the RSC count value can be used as clock value to shift the bit sequence in the randomizer 508. By picking random values of RSC and by using them as the clock value for selecting the number of rows (n), the system is able to ensure more security for the data being transmitted. The various actions in method 1100 may be performed in the order presented, in a different order or simultaneously. Further, in some exemplary embodiments, some actions listed in FIG. 11 may be omitted.

Figure 12:
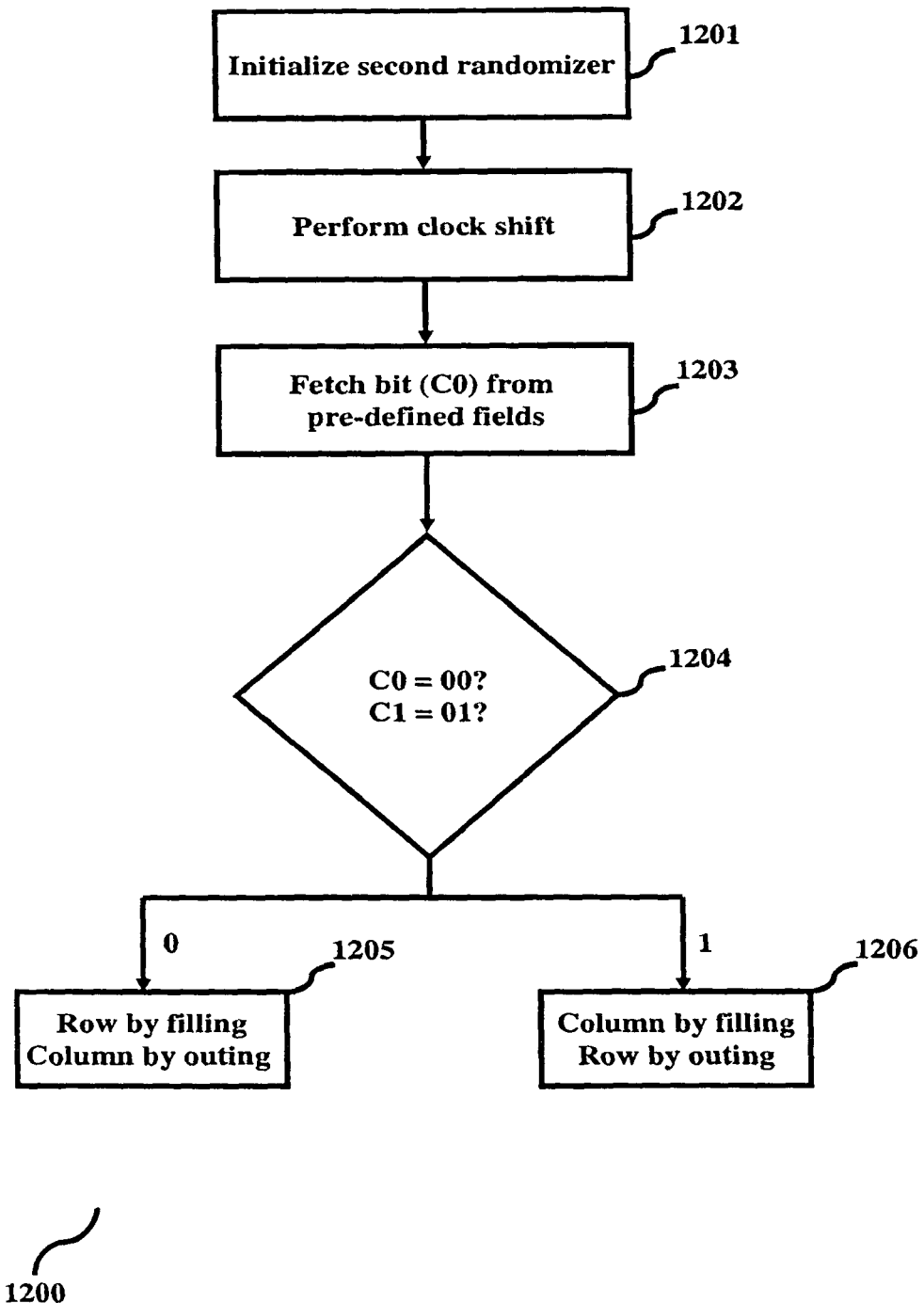
FIG. 12 illustrates a flow diagram that shows various steps involved in the process of selecting a data filling/releasing format for a matrix using a randomizer according to an exemplary embodiment of the present invention.

FIG. 12 illustrates a flow diagram that shows various steps involved in the process of selecting a data filling/releasing format for a matrix using a randomizer according to an exemplary embodiment of the present invention.

Referring to FIG. 12, the data filling/releasing format refers to the format in which the data is filled/released in the matrix form. For example, in a 2-dimensional mode of interleaving, the data filling format refers to whether the data is to be filled row wise or column wise.

In order to calculate the data filling/releasing format, the processing module 401 initializes in step 1201 a second randomizer 508. The second randomizer 508 is initialized by inputting a random bit sequence to the randomizer 508. Further, using a clock pulse generated by the clock generator 507, the processing module 401 performs in step 1202 a clock shift of the bit sequence present in the second randomizer 508. After performing the clock shift of the bit sequence, the processing module 401 fetches in step 1203 a predefined number of bits from a pre-defined location in the randomizer 508. For example, the processing module 401 can fetch a single bit (C0) from a pre-defined position in the randomizer 508.

Further, the fetched bit (C0) is compared in step 1204 with values stored in a corresponding database. The database can be an LUT that includes information on data filling/releasing format to be selected corresponding to the fetched bit. For example, Table 3 shows a database that comprises data filling/releasing format corresponding to value of the fetched bit (C0).

TABLE 3

| C0 | Data filling order | Data releasing order |
|---|---|---|
| 0 | Row by filling | Column by outing |
| 1 | Column by filling | Row by outing |

If the fetched bit C0=0, the processing module 401 selects in step 1205 row by row filling and column by column outing mode for data filling/releasing. If the fetched bit C0=1, the processing module 401 selects in step 1206 column by column filling and row by row outing mode for data filling/releasing. Further, data filling/releasing is performed by the dynamic interleaving module 402 according to the selected data filling/releasing format.

In one exemplary embodiment, the data filling/releasing format can be dynamically calculated/changed in order to ensure better security to the data transfer. Further, an RSC value also can be employed to dynamically calculate/change the data filling/releasing format value. The various actions in method 1200 may be performed in the order presented, in a different order or simultaneously. Further, in some exemplary embodiments, some actions listed in FIG. 12 may be omitted.

Figure 13:
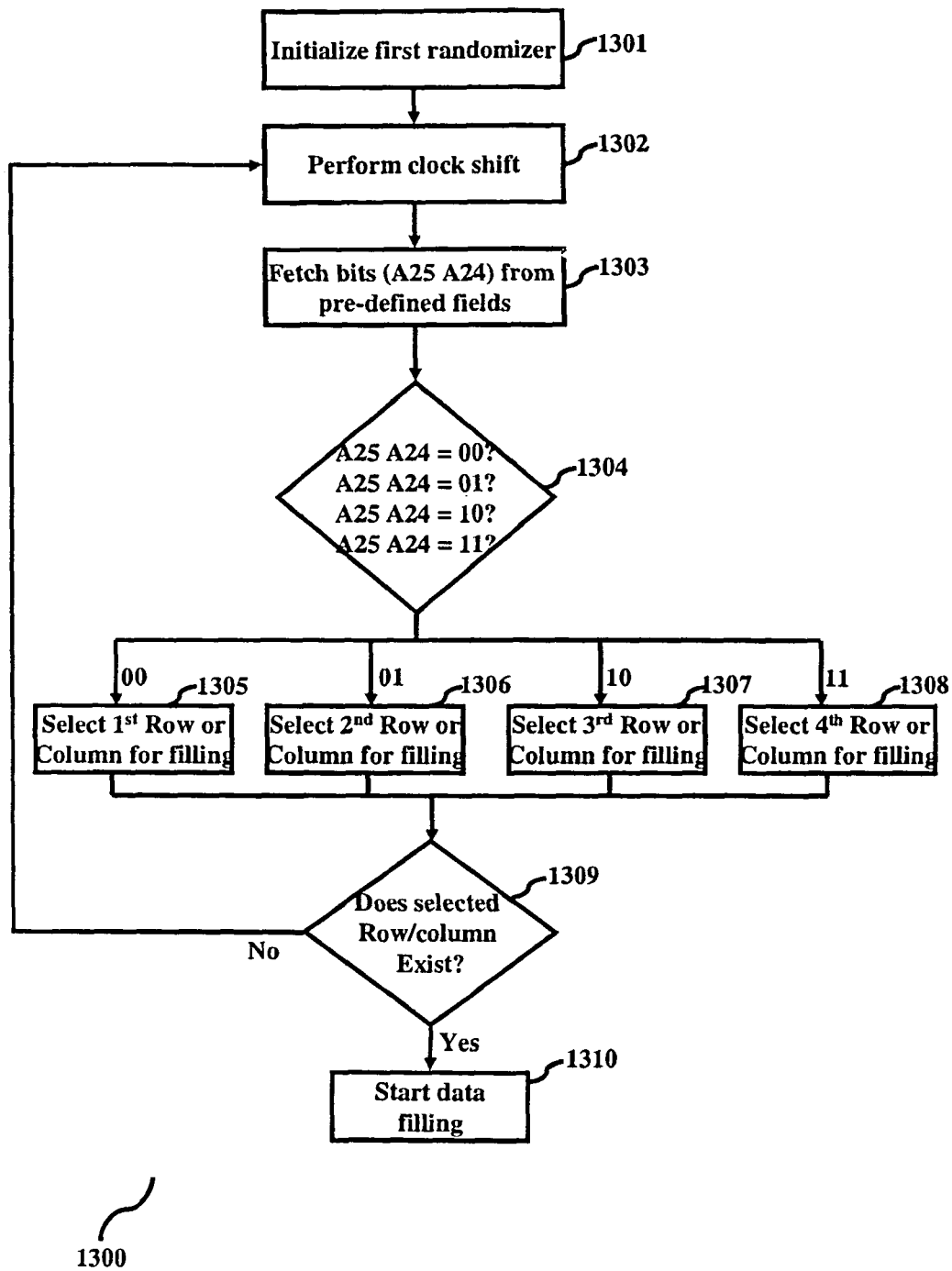
FIG. 13 illustrates a flow diagram that shows various steps involved in the process of selecting a data filling order for a matrix using a randomizer according to an exemplary embodiment of the present invention.

FIG. 13 illustrates a flow diagram that shows various steps involved in the process of selecting a data filling order for a matrix using a randomizer according to an exemplary embodiment of the present invention.

Referring to FIG. 13, once the data filling format is selected, the processing module calculates the data filling/releasing order. The data filling/releasing order refers to the order in which the data is to be filled/released in the matrix. For example, consider a 2-dimensional matrix form in which the data filling/releasing format is selected as row by row filling and column by column releasing. In this case, the data filling order refers to which row is to be filled first. For example, if the data filling order is selected as row 1 first, data filling starts from the 1st row followed by successive rows. Similarly, if the data releasing order is selected to begin from column 2, data releasing starts from column 2 followed by successive columns. Similarly, the data filling and releasing order can also be calculated for a 3-dimensional matrix. In case of a 3-dimensional matrix, data filling can occur row wise, column wise or in a layer wise manner.

In order to calculate the data filling order for a matrix, the processing module 401 initializes in step 1301 a first randomizer 508 by inputting a random bit sequence to the randomizer 508. Further, the processing module 401 performs in step 1302 a clock shift of the bit sequence being fed as input to the second randomizer 508. The processing module 401 can generate the clock signal for performing the clock shift using the clock generator 507.

Further, the processing module 401 fetches in step 1303 a certain number of bits from pre-defined fields in the randomizer 508. For example, consider that the randomizer 508 fetches 2 bits (A25 and A24) from the randomizer bit sequence. Further, the fetched bits are compared in step 1304 with pre-stored database in the memory module 505. In an exemplary embodiment, the database present in the memory module 505 can contain at least one LUT that includes information on a data filling order to be selected corresponding to the fetched bit sequence.

If the fetched bit sequence is A25 A24=00, the processing module 401 selects in step 1305 1st row or column for data filling. If the fetched bit sequence is A25 A24=01, the processing module 401 selects in step 1306 2nd row/column for data filling, and so on. Further, the data filling occurs based on the data filling format selected. For example, if the data filling format is selected as row by row filling and column by column outing, and if the data filling order is selected as 1st row/column, data filling begins from the 1st row. For example, Table 4 shows a data filling order corresponding to the fetched bit sequence, for a 2-dimensional matrix.

TABLE 4

| Bit sequence | Filling number |
|---|---|
| 00 | 1 |
| 01 | 2 |
| 10 | 3 |
| 11 | 4 |

Further, the system checks in step 1309 whether the selected row/column exists. In an exemplary embodiment, the system can check if the selected row/column exist or not by comparing the selected row/column number with the number of rows (m) or columns (n) present in the matrix. For example, it can happen that the matrix is a 2*3 matrix and the row selected for beginning data filling is 4. In this case, the selected row does not exist as the matrix has only 2 rows. In such cases, the processing module perform in step 1302 clock shift of the randomizer bit sequence and selects a new row/column for data filling based on the newly fetched bits. If the selected row/column exists, the data filling block 603 starts data filling from the selected row/column in step 1310. In an exemplary embodiment, the size of the LUT can be extended or varied according to the data size with more selection options and the randomizers can also be modified accordingly.

For a 3-dimensional interleaving format, the data filling can take place in 3 different planes that are row by row filling, column by column filling and layer by layer filling. In this case, the processing module 401 can fetch at least 3 bits from the randomizer bit sequence, which is then compared with an LUT present in the database. Further, based on the values of the fetched bit sequence, the processing module 401 can select a data filling format. An example is provided below of an LUT that comprises a bit sequence value and a corresponding data filling order for a 3-dimensional interleaving format.

| Bit sequence value | | | |
|---|---|---|---|
| 000 | Row by filling | Column by filling | Layer by filling |
| 001 | Row by filling | Layer by filling | Column by filling |
| 010 | Column by filling | Row by filling | Layer by filling |
| 011 | Column by filling | Layer by filling | Row by filling |
| 100 | Layer by filling | Row by filling | Column by filling |
| 101 | Layer by filling | Column by filling | Row by filling |

In one exemplary embodiment, the data filling order can be dynamically calculated/changed in order to ensure better security to the data transfer. Further, an RSC value also can be employed to dynamically calculate/change the data filling order value. The various actions in method 1300 may be performed in the order presented, in a different order or simultaneously. Further, in some exemplary embodiments, some actions listed in FIG. 13 may be omitted.

Figure 14:
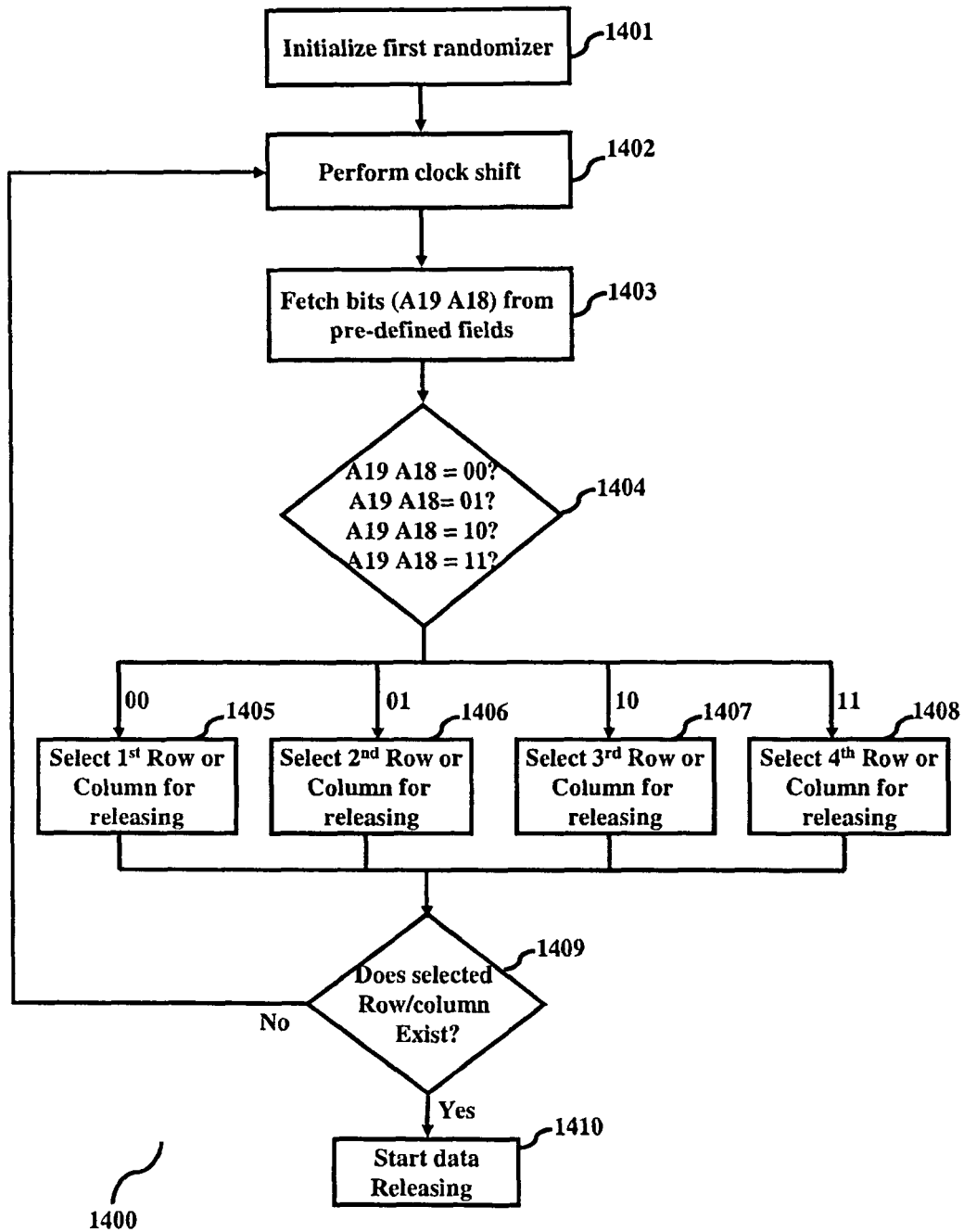
FIG. 14 illustrates a flow diagram that shows various steps involved in the process of selecting a data releasing order for a matrix using a randomizer according to an exemplary embodiment of the present invention.

FIG. 14 illustrates a flow diagram that shows various steps involved in the process of selecting a data releasing order for a 2-dimensional matrix using a randomizer according to exemplary embodiments of the present invention.

Referring to FIG. 14, once the data releasing format is selected, the processing module calculates the data filling/releasing order. The data filling/releasing order refers to the order in which the data is to be filled/released in the matrix. For example, consider a 2-dimensional matrix form, in which the data filling/releasing format is selected as row by row filling and column by column releasing. In this case, the data releasing order refers to from which column data is to be released first. For example, if the data releasing order is selected as column 2 first, data releasing starts from the 2nd column followed by successive columns. Similarly, the data releasing order can be calculated for a 3-dimensional matrix also. In various exemplary embodiments, after selecting the filling/releasing order, the filling/releasing can be done sequentially or in a hopped manner or in a random fashion, based on the calculated random sequences by the system.

In order to calculate the data releasing order for a matrix, the processing module 401 initializes in step 1401 a first randomizer 508 by inputting a random bit sequence to the randomizer 508. Further, the processing module 401 performs in step 1402 a clock shift of the bit sequence being fed as input to the second randomizer 508. The processing module 401 can generate the clock signal for performing the clock shift using the clock generator 507.

Further, the processing module 401 fetches in step 1403 a certain number of bits from pre-defined fields in the randomizer 508. For example, for a 2-dimensional matrix, the randomizer 508 fetches 2 bits (A19 and A18) from the randomizer bit sequence. Further, the fetched bits are compared in step 1404 with pre-stored database in the memory module 505. In an exemplary embodiment, the database present in the memory module 505 can contain at least one LUT that includes information on a data releasing order to be selected corresponding to the fetched bit sequence. For example, Table 5 depicts data a releasing format for a 2-dimensional matrix corresponding to specific values of fetched bits.

TABLE 5

| Bit sequence | Releasing number/order |
|---|---|
| 00 | 1 |
| 01 | 2 |
| 10 | 3 |
| 11 | 4 |

If the fetched bit sequence is A19 A18=00, the processing module 401 selects in step 1405 1st row or column for data releasing. If the fetched bit sequence is A19 A18=01, the processing module 401 selects in step 1406 2nd row/column for data releasing. If the fetched bit sequence is A19 A18=10, the processing module 401 selects in step 1407 3rd row/column for data releasing. If the fetched bit sequence is A19 A18=11, the processing module 401 selects in step 1408 4th row/column for data releasing. Further, the data releasing occurs based on the data releasing format selected. For example, if the data releasing format is selected as column by column outing, and if the data releasing order is selected as from the 2nd column, data releasing begins from the 2nd column.

Further, the system checks in step 1409 whether the selected row/column exists. In an exemplary embodiment, the system can check if the selected row/column exists by comparing the selected row/column number with the number of rows (m) or columns (n) present in the matrix. For example, it can happen that the matrix is a 2*3 matrix and the column selected for beginning data release is 4. In this case, the selected column does not exist because the matrix has only 3 columns. In such a case, the processing module may perform in step 1402 a clock shift of the randomizer bit sequence and select a new row/column for data filling based on the newly fetched bits. If the selected row/column exists, a data releasing block present in the destination user device 101.*b* starts in step 1410 data releasing from the selected row/column.

In one exemplary embodiment, the data releasing order can be dynamically calculated/changed in order to ensure better security to the data transfer. Further, an RSC value also can be employed to dynamically calculate/change the data releasing value. For example, consider an 8*8 matrix for which the format for data filing/releasing format is selected as row wise filling and column wise releasing and the order for filling and releasing selected as 3 and 4 respectively. Then, the filling will start from the 3rd row followed by the 4th row up to 8th row and automatic filling will start from the first row because the matrix limit (8 rows) ends here and then sequentially 2nd row will be selected to fill data. In an exemplary embodiment, the row wise filling order can be sequential or else can be random.

Further, at the receiver, the data releasing starts from the 4th column, followed by 5th column up to 8th and the automatically releasing will start from the 1st column because the matrix limit (8 columns) ends here and then sequentially the 2nd column will be selected to release data and then the 3rd. In an exemplary embodiment, the column wise releasing order can be sequential or can be random.

In an exemplary embodiment, the data releasing order can also be calculated for a 3-dimensional matrix. For a 3-dimensional interleaving format, the data releasing can take place in 3 different planes which are row by row releasing, column by column releasing and layer by layer releasing. Further, in case of a 3-dimensional matrix, at least 5 different data releasing formats can be present corresponding to each of the data filling format. For example, if a data filling format selected for the 3-dimensional matrix is 000, then correspondingly at least 5 different data releasing formats can be present. Similarly, if the data filling order is 001, another 5 different data releasing formats can be available.

Table 6 shows data releasing formats corresponding to the data filling order 000.

TABLE 6

| Data filling order | Data releasing format | | | Data releasing indicator |
|---|---|---|---|---|
| 000 | Column by releasing | Row by releasing | Layer by releasing | 1 |
| 000 | Column by releasing | Layer by releasing | Row by releasing | 2 |
| 000 | Layer by releasing | Row by releasing | Column by releasing | 3 |
| 000 | Layer by releasing | Column by releasing | Row by releasing | 4 |
| 000 | Row by releasing | Layer by releasing | Column by releasing | 5 |

Similarly, Table 7 shows various data releasing formats corresponding to the data filling order 001.

TABLE 7

| Data filling order | Data releasing format | | | Data release indicator |
|---|---|---|---|---|
| 001 | Layer by releasing | Row by releasing | Column by releasing | 1 |
| 001 | Layer by releasing | Column by releasing | Row by releasing | 2 |
| 001 | Column by releasing | Row by releasing | Layer by releasing | 3 |
| 001 | Column by releasing | Layer by releasing | Row by releasing | 4 |
| 001 | Row by releasing | Column by releasing | Layer by releasing | 5 |

In one exemplary embodiment, a data releasing indicator value decides the data releasing order to be selected corresponding to a particular data filling format. Further, the data releasing indicator value can be calculated using a randomizer or a counter or a combination of both, based on the system architecture and requirements. Further, separate LUTs can be maintained corresponding to each of the data filling format. Similarly, multiple data releasing formats can be available corresponding to other data filling patterns such as 010, 011 and so on.

In case of the 3D matrix data processing, the system checks if the data filling in the matrix is done based on any of the sequences such as 000, 001 and so on. Then, data releasing shall be according to the Table 6 or Table 7 and so on, to maintain the interleaving and the proper recovery of the data at the receiving side. The various actions in method 1400 may be performed in the order presented, in a different order or simultaneously. Further, in some exemplary embodiments, some actions listed in FIG. 14 may be omitted.

Figure 15:
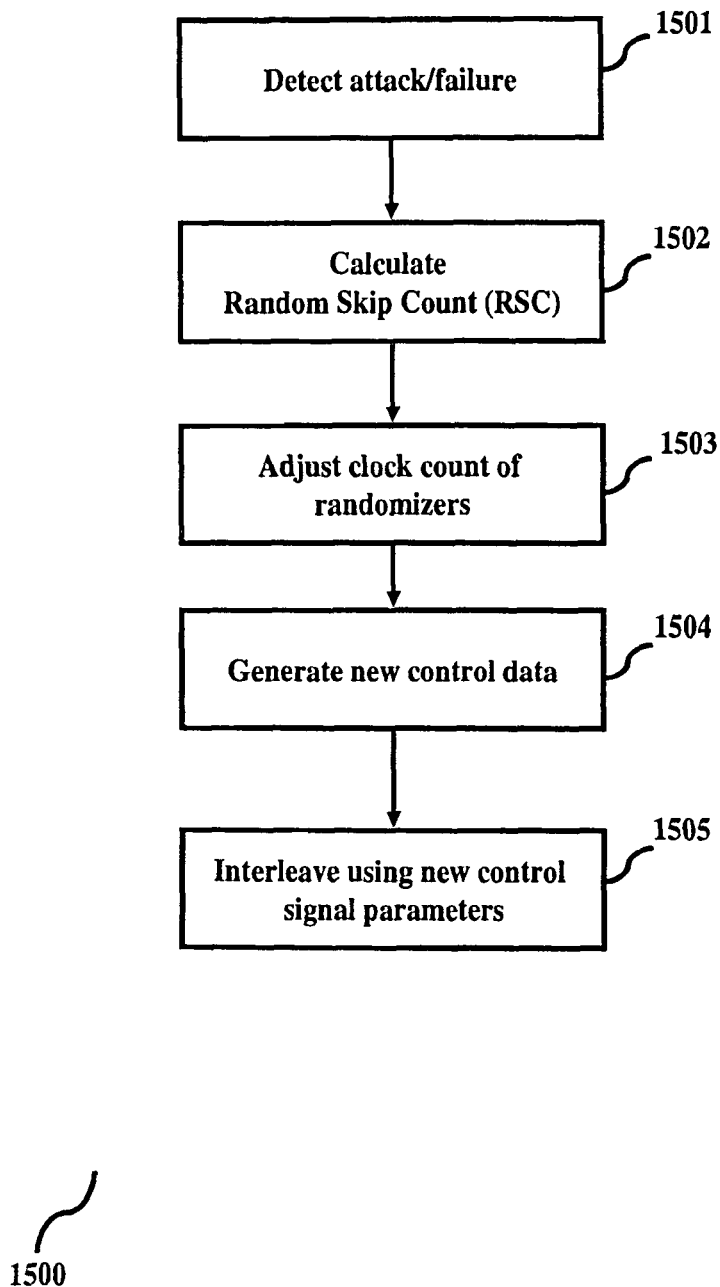
FIG. 15 illustrates a flow diagram that shows various steps involved in the process of implementing Random Skip Count (RSC) for improved security according to an exemplary embodiment of the present invention.

FIG. 15 illustrates a flow diagram that shows various steps involved in the process of implementing RSC for improved security according to exemplary embodiments of the present invention.

Referring to FIG. 15, an initial value of RSC=0. The RSC sequence is employed for obtaining improved data security in case of attack and/or data delivery failure. The system checks for any attack for data delivery failure in the message transmission. If any attack or failure is detected in step 1501, the system calculates in step 1502 an RSC value. In an exemplary embodiment, the RSC value is calculated using a third randomizer 508. The third randomizer 508 can provide a binary sequence of 8 bits. Decimal equivalent of this binary sequence can be used as the RSC value.

Further, the system adjusts in step 1503 a clock count value of the first and second randomizers based on the calculated RSC value. In an exemplary embodiment, the RSC value is used as the clock count value for the first and second randomizers 508. Further, using the RSC value as the clock count, the system dynamically calculates in step 1504 new values to the control signal parameters. Further, using the new control signal parameter values, the data is interleaved in step 1505 and is transmitted to the destination. The calculated RSC value also is transmitted to the destination using a secured channel and the destination user device 101.*b* can use the RSC count to pick the interleaved parameters/settings from the received information. The various actions in method 1500 may be performed in the order presented, in a different order or simultaneously. Further, in some exemplary embodiments, some actions listed in FIG. 15 may be omitted.

Figure 16:
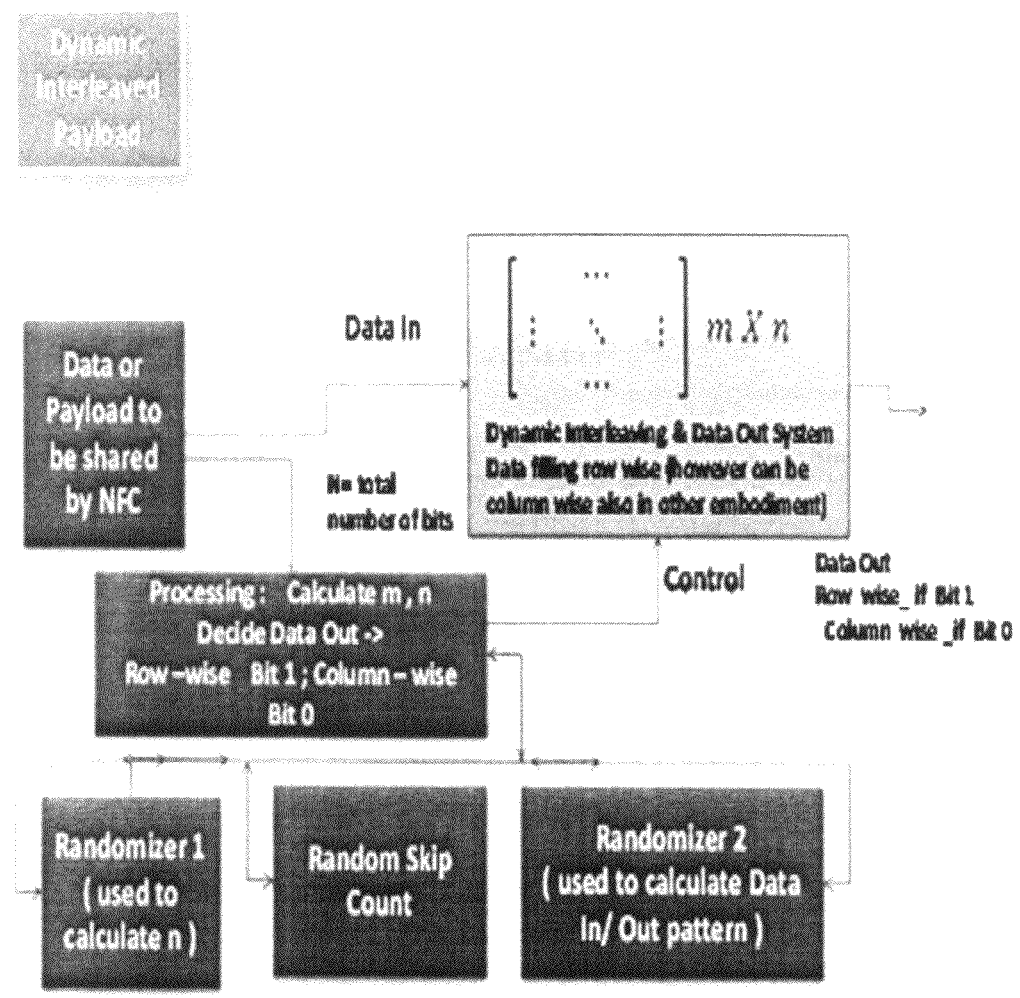
FIG. 16 illustrates a system architecture of a dynamic interleaving system according to an exemplary embodiment of the present invention.

FIG. 16 illustrates a system architecture of a dynamic interleaving system according to an exemplary embodiment of the present invention.

Referring to FIG. 16, the data to be transmitted to a receiver device using an NFC mechanism is fed as input to the interleaving module 402 in the dynamically interleaved payload generation module 302. Further, the interleaving module 402 receives a control signal from a processing module 401, which is a part of the dynamic interleaved payload generation module 302. The processing module 401 can generate the control signal by receiving the data signal as input for processing. Further, the control signal can comprise various dynamic interleaving parameters such as a number of rows, a number of columns, a data filling/releasing format, a data filling order, a data releasing order, an RSC, and so on. The interleaving parameters can be calculated using randomizers and/or by using suitable equations. Further, using the control signal parameters, the interleaving module 402 in the dynamic interleaved payload generation module 302 perform dynamic interleaving of the data to be transmitted/shared.

Figure 17:
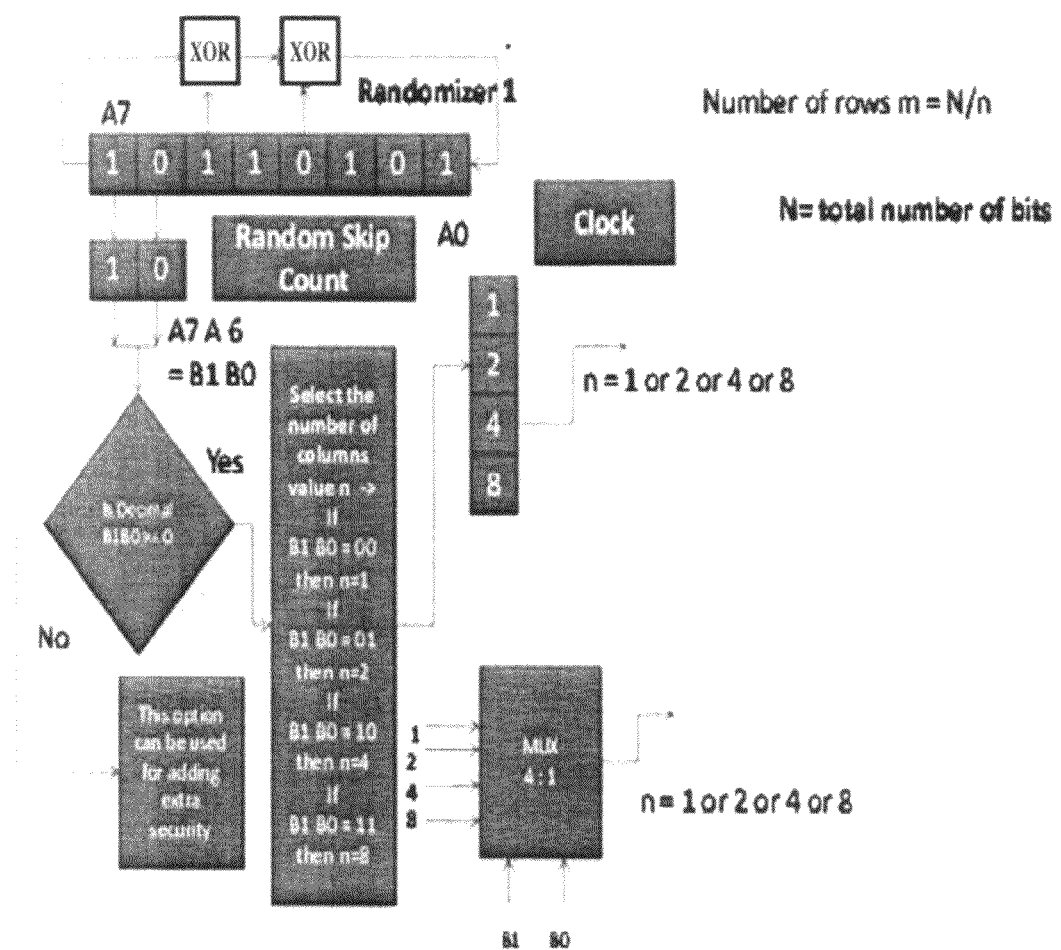
FIGS. 17, 18 and 19 illustrate system architectures for measuring a number of rows and a number of columns using randomizers according to exemplary embodiments of the present invention.
Figure 18:
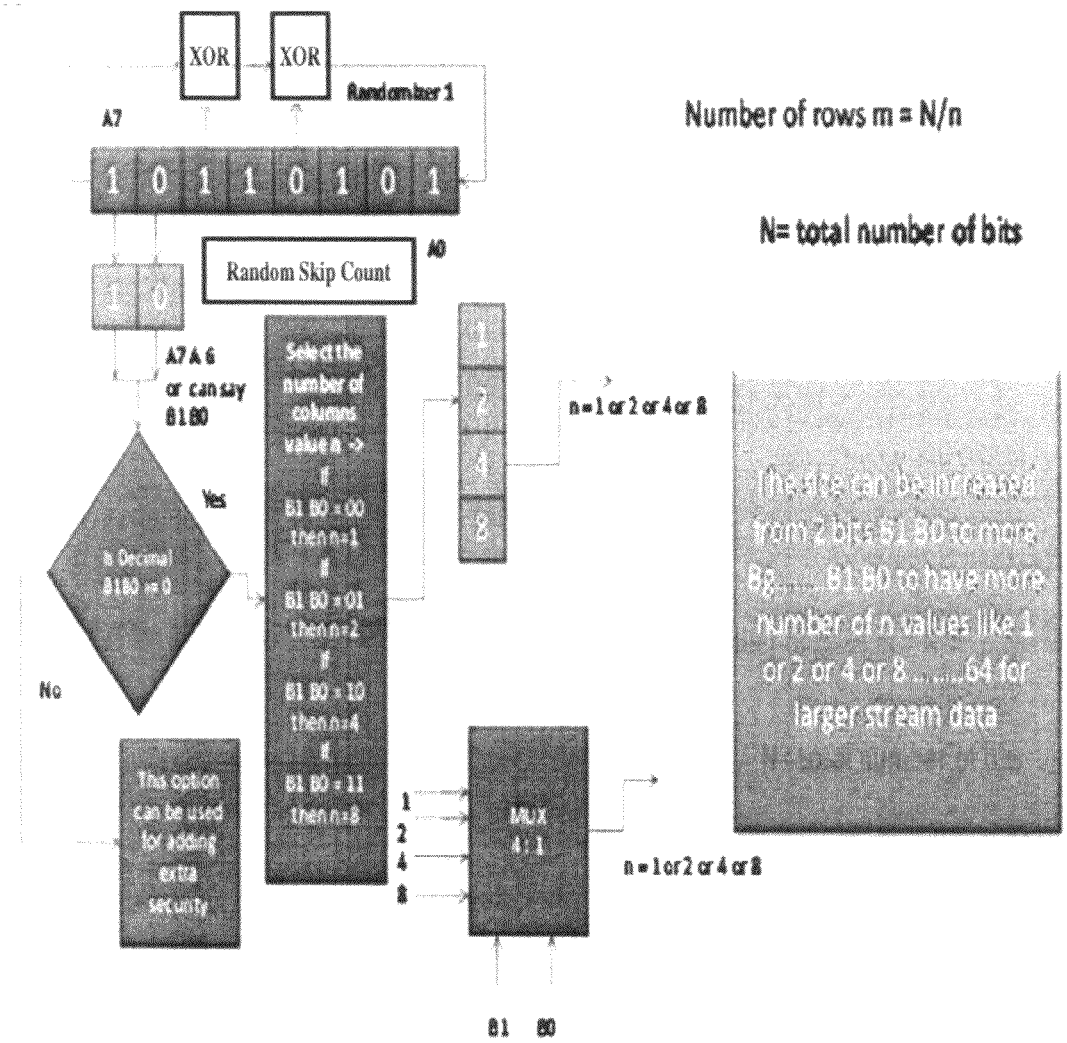
Figure 19:
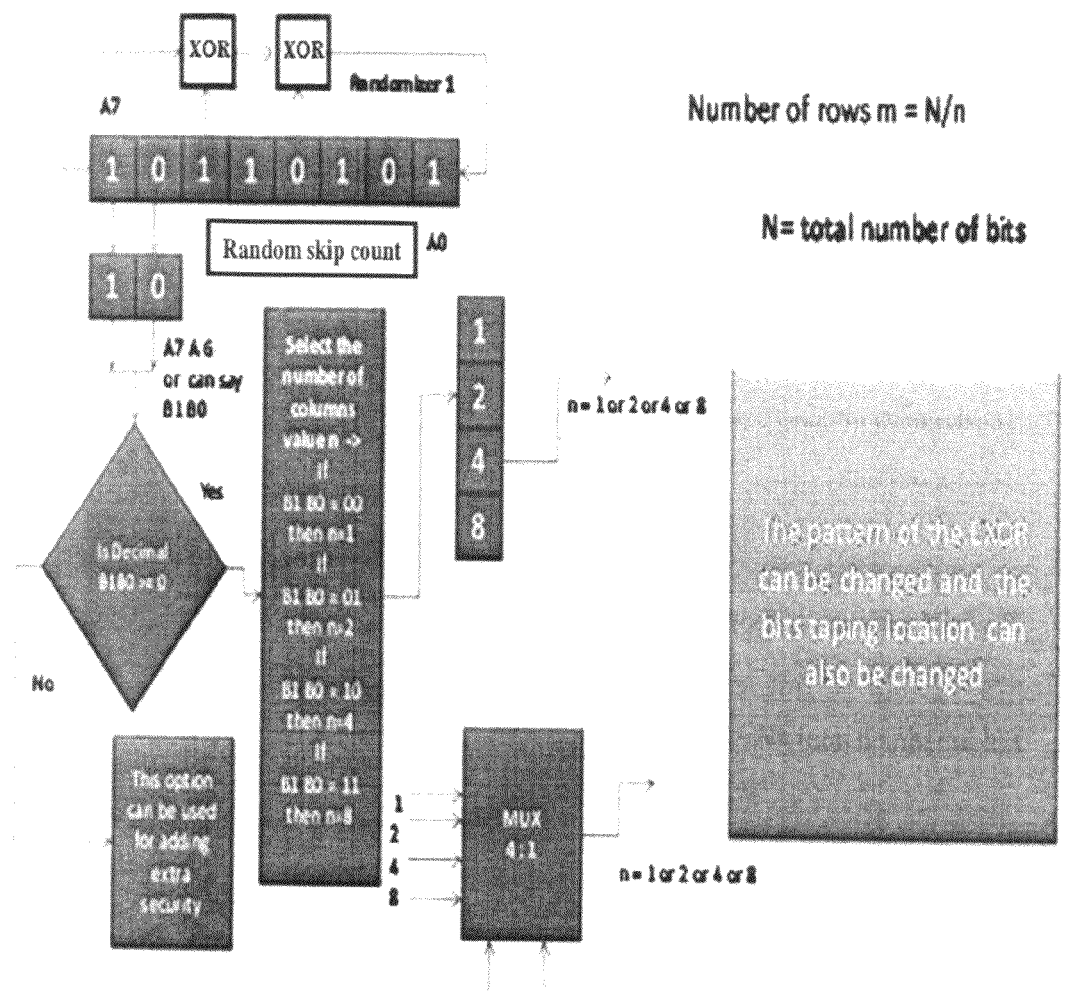

FIGS. 17, 18 and 19 illustrate system architecture for measuring a number of rows and a number of columns using randomizers according to exemplary embodiments of the present invention.

Referring to FIGS. 17, 18 and 19, for a 2-dimensional matrix, if the number of rows (m) is calculated using randomizer 508, then the number of columns (n) is calculated using a suitable equation or else if the number of columns (n) is calculated using randomizers 508, then the number of rows (m) is calculated using a suitable equation. In the proposed architecture for calculating the number of rows or columns, the randomizer 508 is initiated by inputting a bit sequence. Further, a clock shift is performed to the inputted bit sequence and two bits from pre-defined location in the bit sequence are fetched. Further, the fetched bits are compared with an LUT. The LUT can comprise number of rows (m) to be selected corresponding to the fetched bit sequences. Based on the value in the LUT, the system selects/decides the number of rows (m) for the 2-dimensional matrix.

Figure 20:
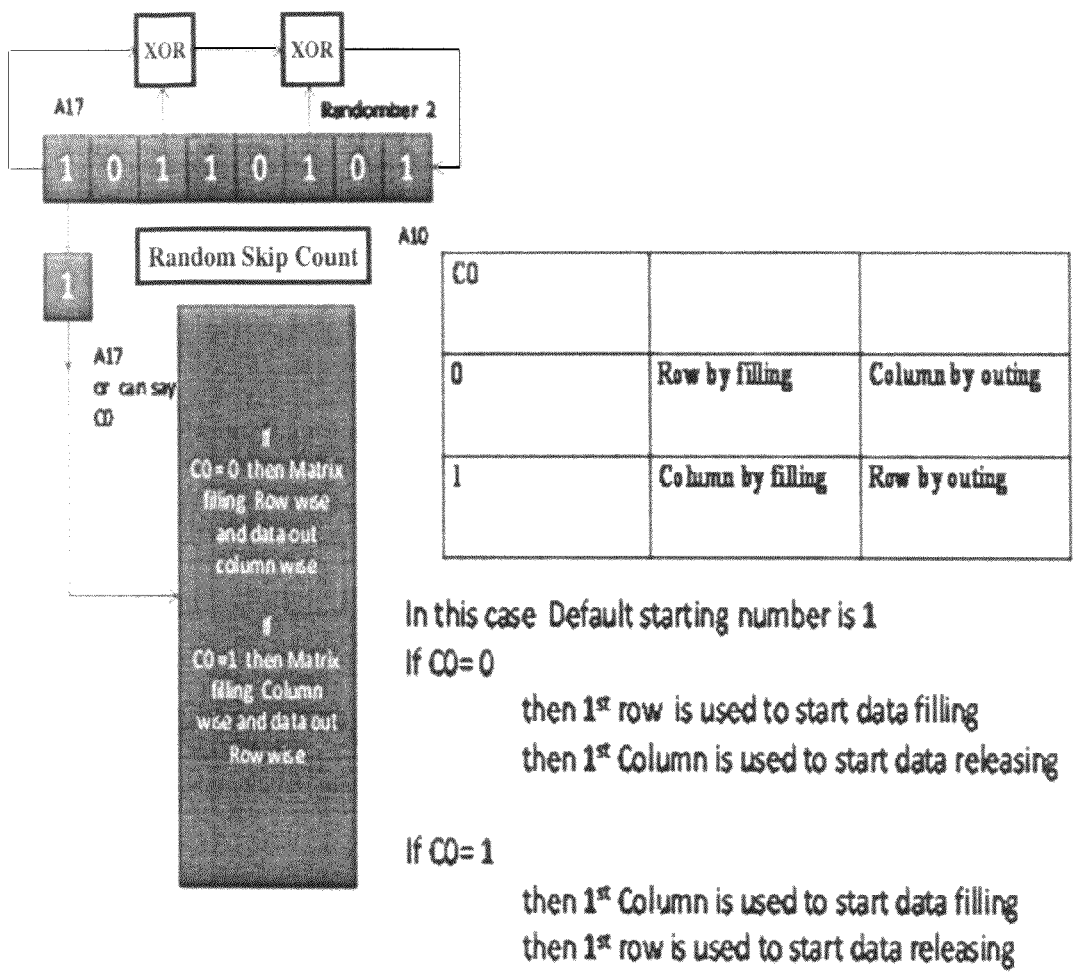
FIG. 20 illustrates a system architecture for calculating a data filling/releasing format for a 2-dimensional matrix according to an exemplary embodiment of the present invention.

FIG. 20 illustrates a system architecture for calculating a data filling/releasing format for a 2-dimensional matrix according to an exemplary embodiment of the present invention.

Referring to FIG. 20, the randomizer 508 is initialized by inputting a bit sequence of suitable length (for example; 8 bits, depending on the size of randomizer) to the randomizer 508. Further, the system performs a clock shift of the bit sequence fed to the randomizer 508. Further, the system fetches a bit from a pre-defined location in the bit sequence and compares the fetched bit with an LUT. The LUT can comprise information on which data filling/releasing format is to be used corresponding to the fetched bit. Further, the selected data filling/releasing format is used for data filling/releasing to and from the 2-dimensional matrix. For example, for the 2-dimensional matrix, the data filling/releasing format can be either row by row filling-column by column outing or column by column filling-row by row outing. Further, in this method, the bits can be picked from any place in the sequence, as set by the system. Further, the bits can be tapped from any set location, the location being configurable by the system.

Figure 21:
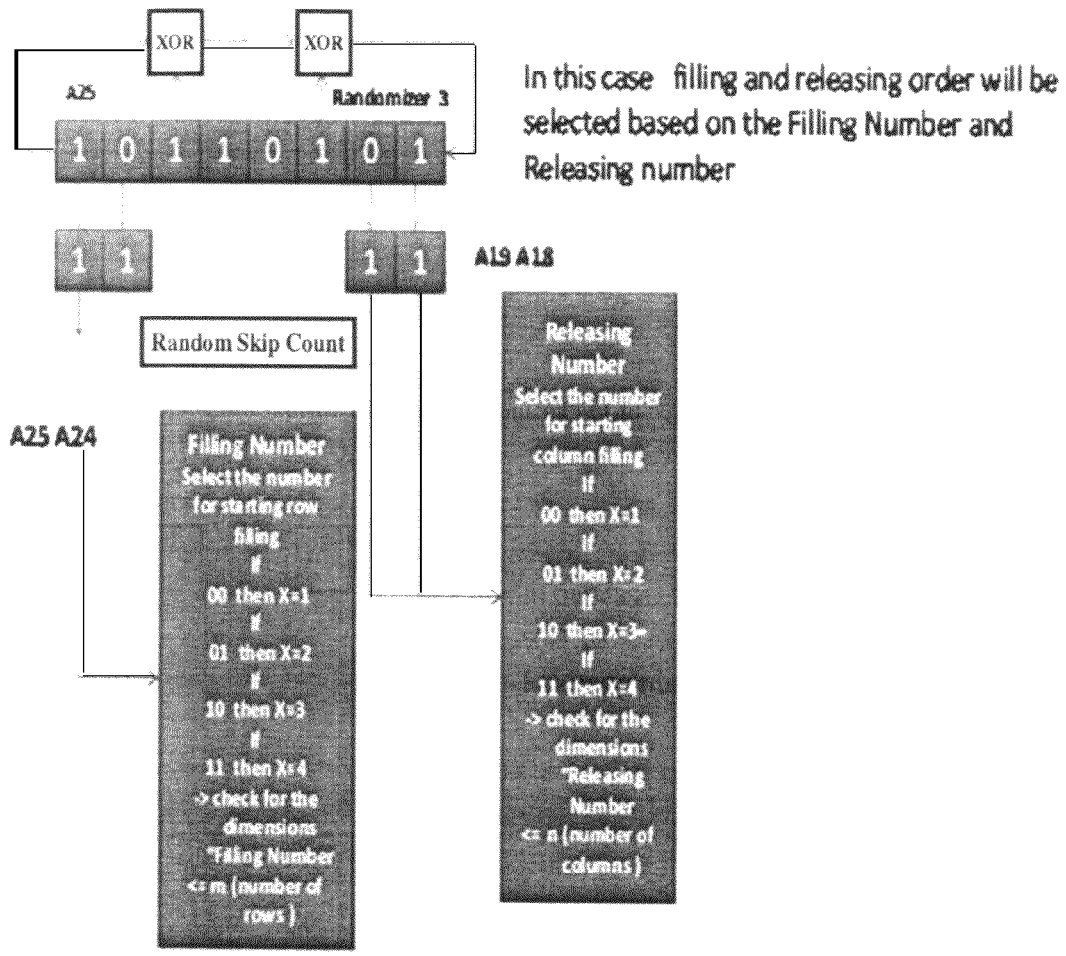
FIGS. 21 and 22 illustrate a system architecture for calculating a data filling/releasing order for a 2-dimensional matrix according to an exemplary embodiment of the present invention.
Figure 22:
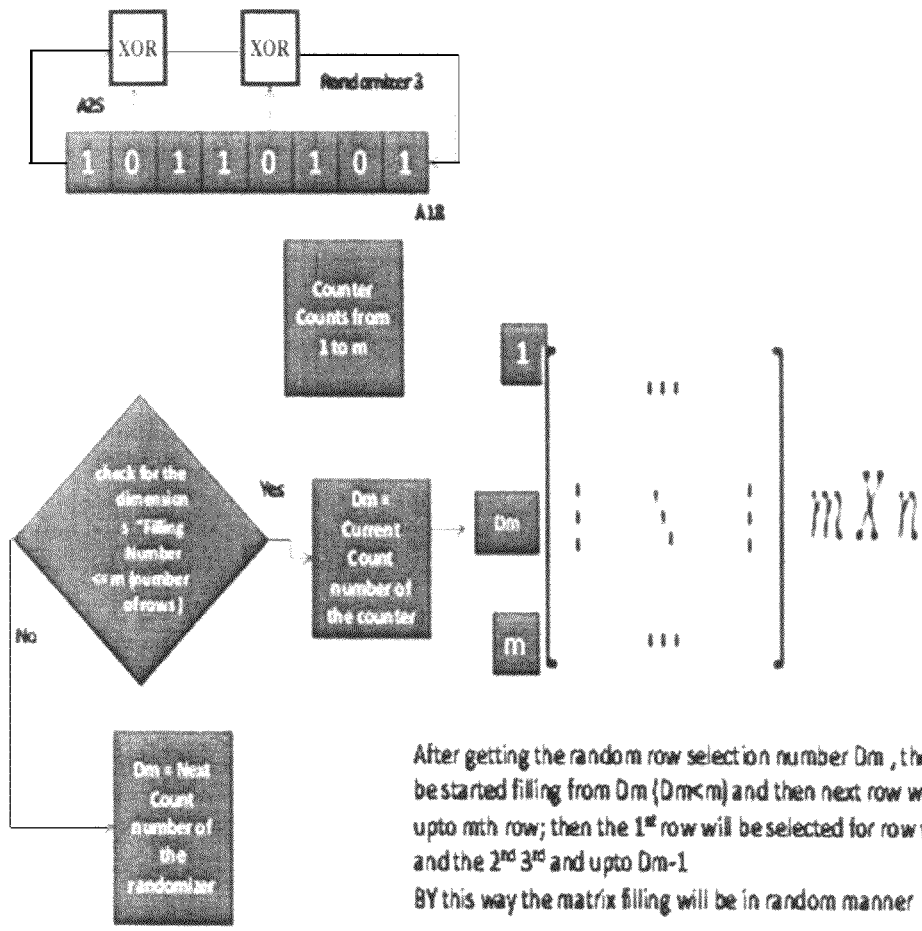

FIGS. 21 and 22 illustrate system architecture for calculating a data filling/releasing order for a 2-dimensional matrix according to exemplary embodiments of the present invention.

Referring to FIGS. 21 and 22, once the data filling/releasing format is selected for the 2-dimensional matrix, then the system calculates a data filling/releasing order for filling and releasing data from and to the 2-dimensional matrix. The data filling/releasing order refers to the order in which data is to be filled/released to and from the 2-dimensional matrix. For example, if the data filling format is row by row filling and if the data filling order is selected as to begin from row 2, then the data is filled starting from the 2nd row in the matrix.

Initially a bit sequence is fed as input to the randomizer 508 and the inputted bit sequence is clock shifted using a clock shift pulse generated using the clock generator 507. Further, bits are fetched from predefined places in the bit sequence and are compared with values present in corresponding LUTs. The LUTs can comprise information on the data filling/releasing order to be used. Further, the selected data filling/releasing order is used for filling and releasing data to and from the matrix.

Figure 23:
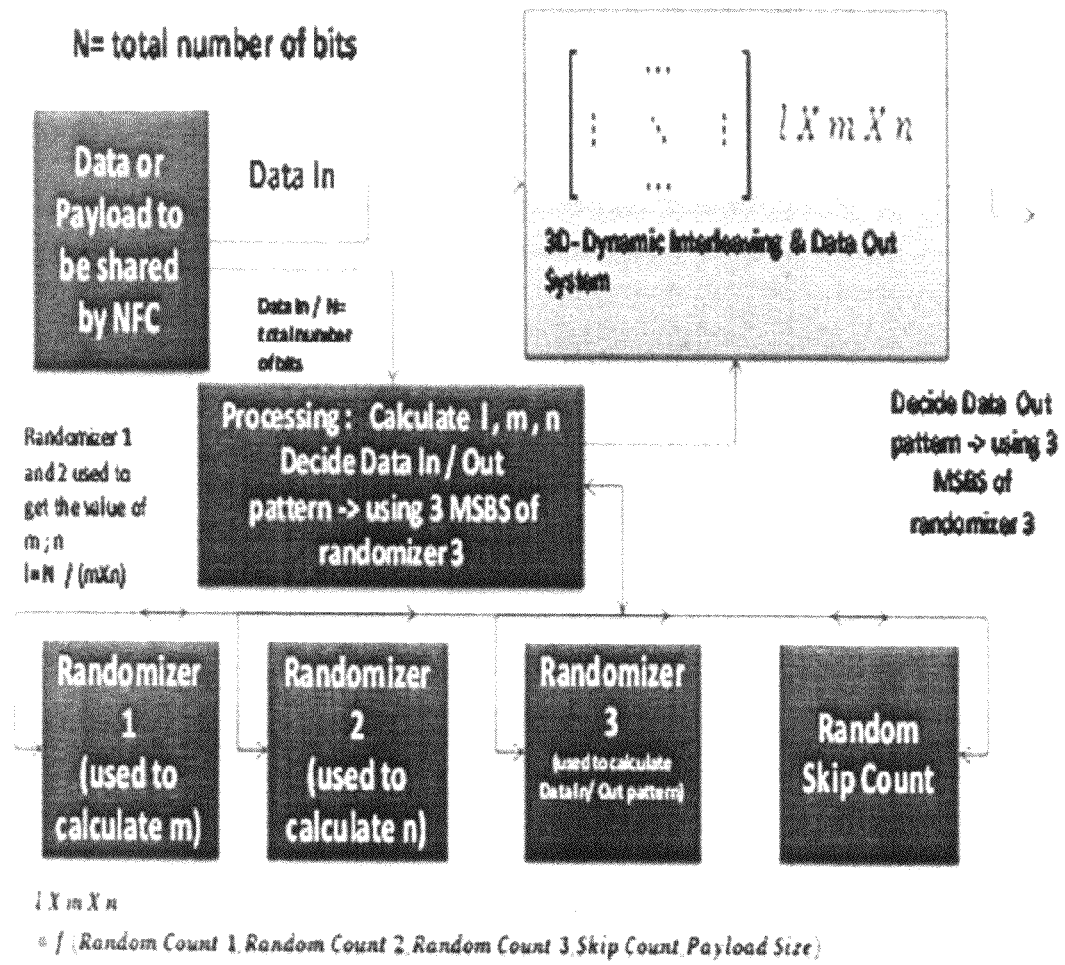
FIG. 23 illustrates a system architecture for 3-dimensional matrix dynamic random interleaving according to an exemplary embodiment of the present invention.

FIG. 23 illustrates a system architecture for 3-dimensional matrix dynamic random interleaving according to an exemplary embodiment of the present invention.

Referring to FIG. 23, the data to be transmitted to a receiver device using an NFC mechanism is fed as input to the interleaving module 402 in the dynamically interleaved payload generation module 302. Further, the interleaving module 402 receives a control signal from a processing module 401, which is a part of the dynamic interleaved payload generation module 302. The processing module 401 can generate the control signal by receiving the data signal as input for processing. Further, the control signal can comprise various dynamic interleaving parameters such as a number of rows, a number of columns, a number of layers, a data filling/releasing format, a data filling order, a data releasing order, an RSC, and so on. The interleaving parameters can be calculated using randomizers and/or by using suitable equations. Further, using the control signal parameters, the interleaving module 402 in the dynamic interleaved payload generation module 302 perform 3-dimensional dynamic interleaving of the data to be transmitted/shared.

Figure 24:
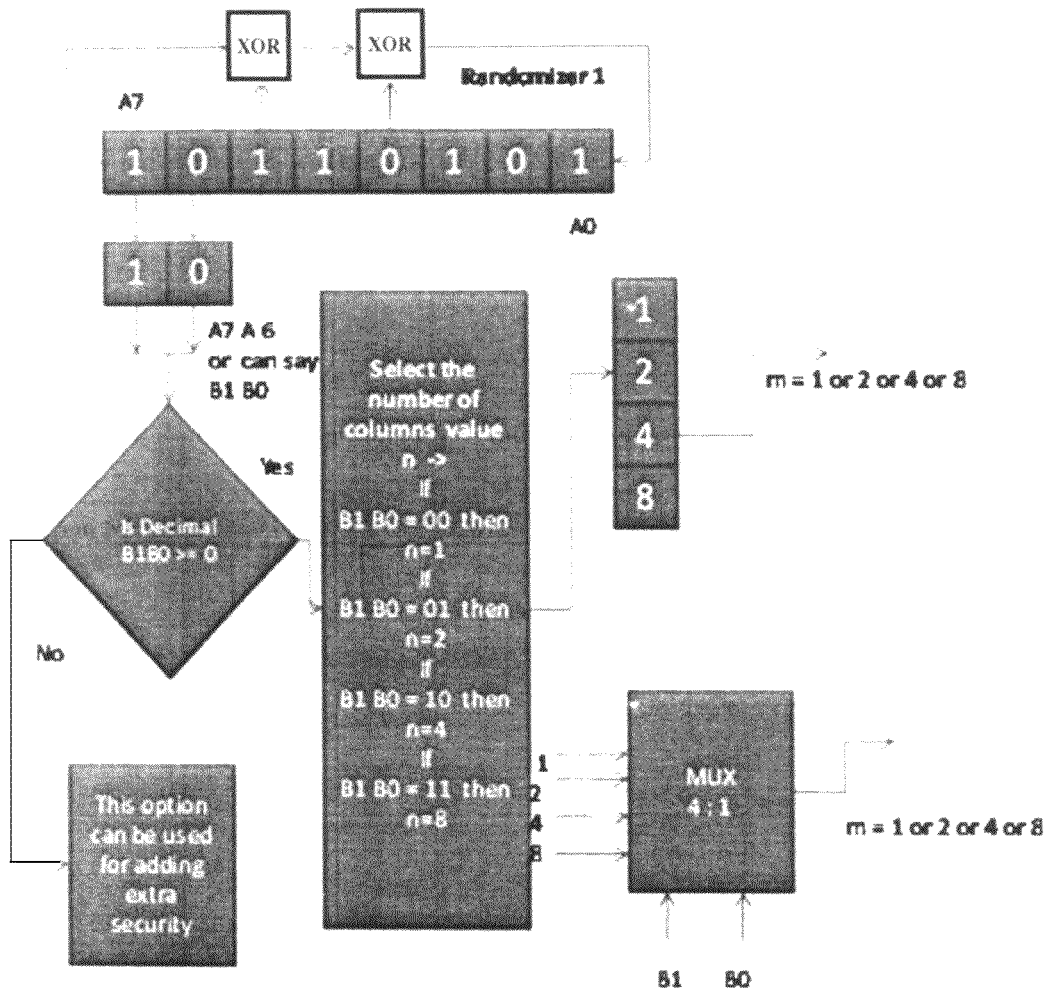
FIG. 24 illustrates a system architecture for calculating a number of rows for a 3-dimensional matrix according to an exemplary embodiment of the present invention.

FIG. 24 illustrates a system architecture for calculating a number of rows for a 3-dimensional matrix according to exemplary embodiments of the present invention.

Referring to FIG. 24, for the 3-dimensional matrix, if any two of the parameters number of rows (m), number of columns (n) and number of layers (l) are calculated using randomizers 508, then the third parameter is calculated using a suitable equation. For example, if the number of rows and number of columns for a 3-dimensional matrix are calculated using randomizers, then the number of layers is calculated using a suitable equation. In the proposed architecture for calculating number of rows, the randomizer 508 is initiated by inputting a bit sequence. Further a clock shift is performed to the inputted bit sequence and two bits from pre-defined location in the bit sequence are fetched. Further, the fetched bits are compared with an LUT. The LUT can comprise a number of rows (m) to be selected corresponding to the fetched bit sequences. Based on the value in LUT, the system selects/decides the number of rows (m) for the 2-dimensional matrix.

Figure 25:
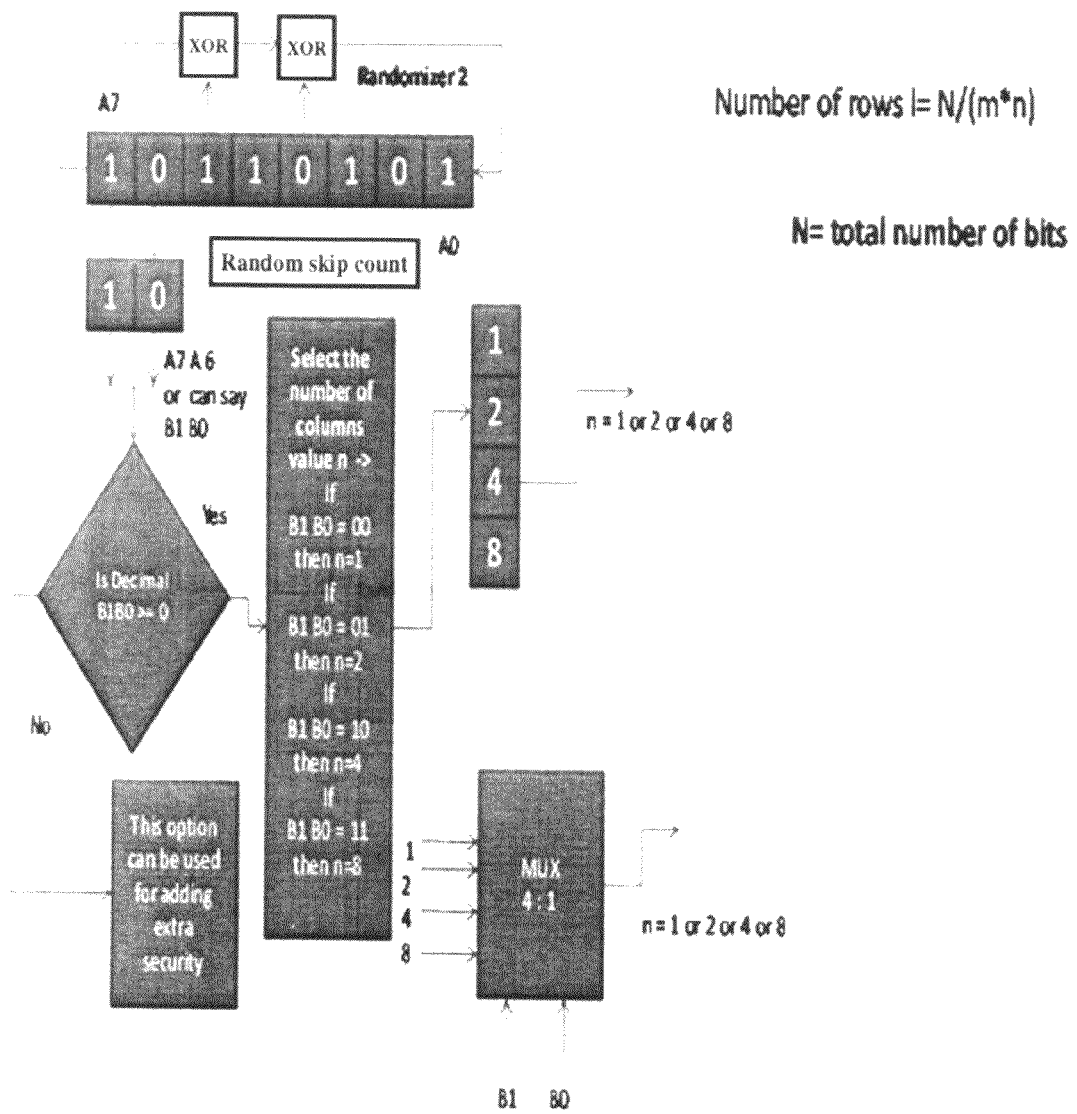
FIG. 25 illustrates a system architecture for calculating a number of rows (m), a number of columns (n), or a number of layers (l) for a 3-dimensional matrix according to an exemplary embodiment of the present invention.

FIG. 25 illustrates a system architecture for calculating a number of rows (m), a number of columns (n), or a number of layers (l) for a 3-dimensional matrix according to an exemplary embodiment of the present invention.

Referring to FIG. 25, for the 3-dimensional matrix, if any two of the parameters number of rows (m), number of columns (n) and number of layers (l) are calculated using randomizers 508, then the third parameter is calculated using a suitable equation. For example, if the number of rows and number of columns for a 3-dimensional matrix are calculated using randomizers, then the number of layers is calculated using a suitable equation. In the proposed architecture for calculating number of rows, the randomizer 508 is initiated by inputting a bit sequence. Further a clock shift is performed to the inputted bit sequence and two bits from pre-defined location in the bit sequence are fetched. Further, the fetched bits are compared with an LUT. The LUT can comprise number of rows (m) to be selected corresponding to the fetched bit sequences. Based on the value in LUT, the system selects/decides the number of rows (m) for the 3-dimensional matrix.

Figure 26:
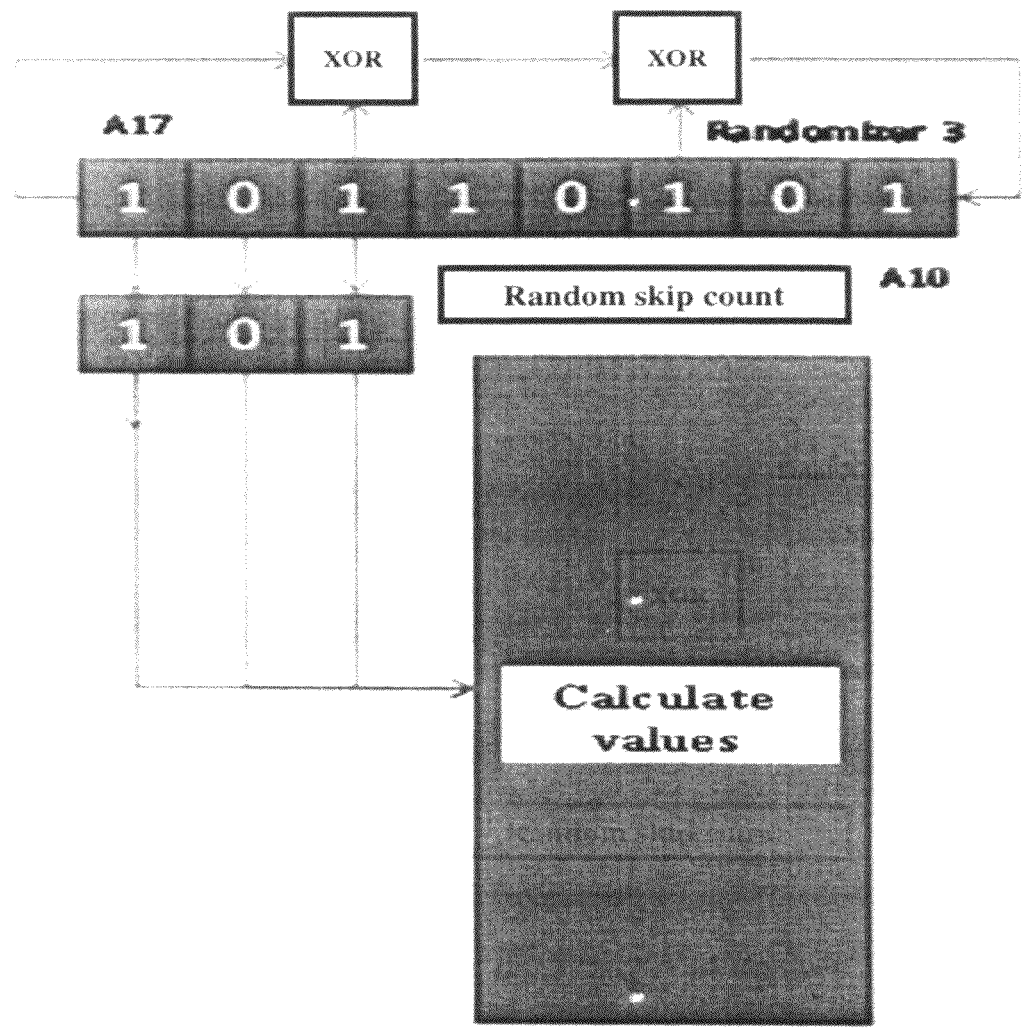
FIG. 26 illustrates a system architecture for calculating a data filling format for a 3-dimensional matrix according to an exemplary embodiment of the present invention.

FIG. 26 illustrates a system architecture for calculating a data filling format for a 3-dimensional matrix according to an exemplary embodiment of the present invention.

Referring to FIG. 26, the data filling format for the 3-dimensional matrix refers to the format in which data is to be filled in the 3D matrix. In the proposed architecture for deciding a data filling format, the randomizer 508 is initiated by inputting a bit sequence. Further a clock shift is performed to the inputted bit sequence and three bits from a pre-defined location in the bit sequence are fetched. Further, the fetched bits are compared with an LUT. The LUT can comprise information on a data filling format corresponding to the fetched bit sequences. Based on the value in LUT, the system selects/decides the data filling format for the 3-dimensional matrix. For a 3-dimensional matrix, data filling can take place starting from any of the row wise, column wise or layer wise modes, with various combinations.

Figure 27:
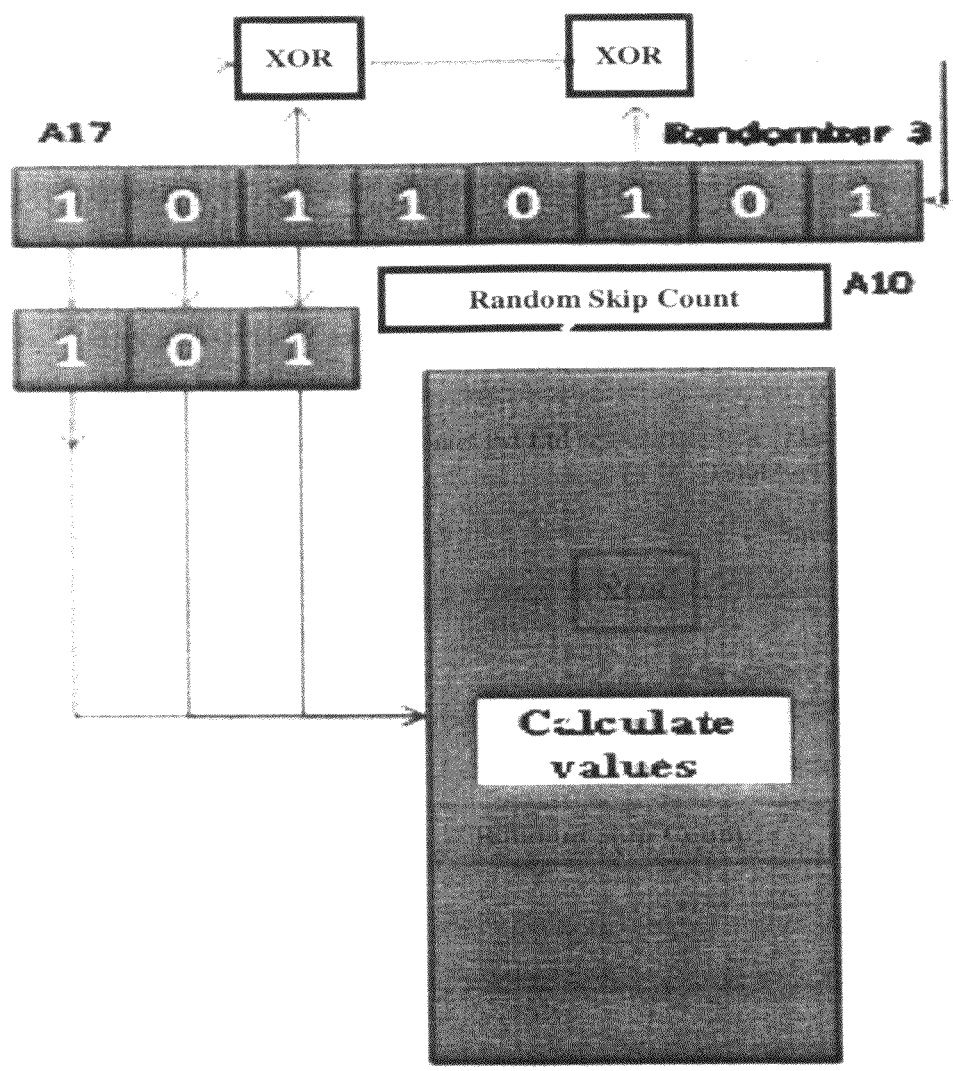
FIG. 27 illustrates a system architecture for calculating a data releasing format for a 3-dimensional matrix according to an exemplary embodiment of the present invention.

FIG. 27 illustrates a system architecture for calculating a data releasing format for a 3-dimensional matrix according to an exemplary embodiment of the present invention.

Referring to FIG. 27, the data releasing format for the 3-dimensional matrix refers to the format in which data is to be released from the 3D matrix. In the proposed architecture for deciding a data releasing format for a 3-dimensional matrix, the randomizer 508 is initiated by inputting a bit sequence. Further, a clock shift is performed to the inputted bit sequence and three bits from pre-defined location in the bit sequence are fetched. Further, the fetched bits are compared with an LUT. The LUT can comprise information on the data releasing order to be selected corresponding to the fetched bit sequences. Based on the data in the LUT, the system selects/ decides the data releasing format for the 3-dimensional matrix. For a 3-dimensional matrix, data releasing can take place starting from any of the row wise, column wise or layer wise modes, with various combinations.

Figure 28:
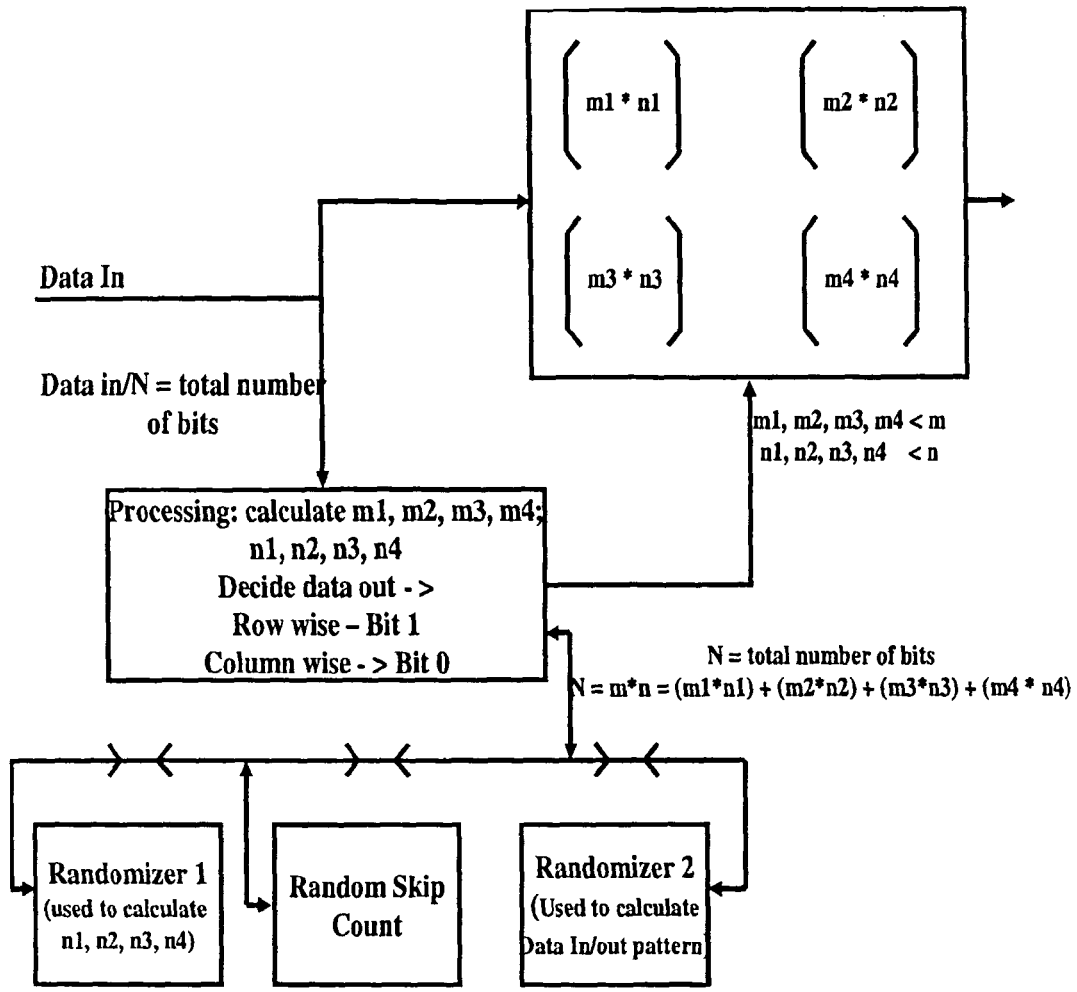
FIGS. 28 and 29 illustrate system architectures for dynamically interleaving sub-matrices for a 2-dimensional matrix and 3-dimensional matrix respectively according to exemplary embodiments of the present invention.
Figure 29:
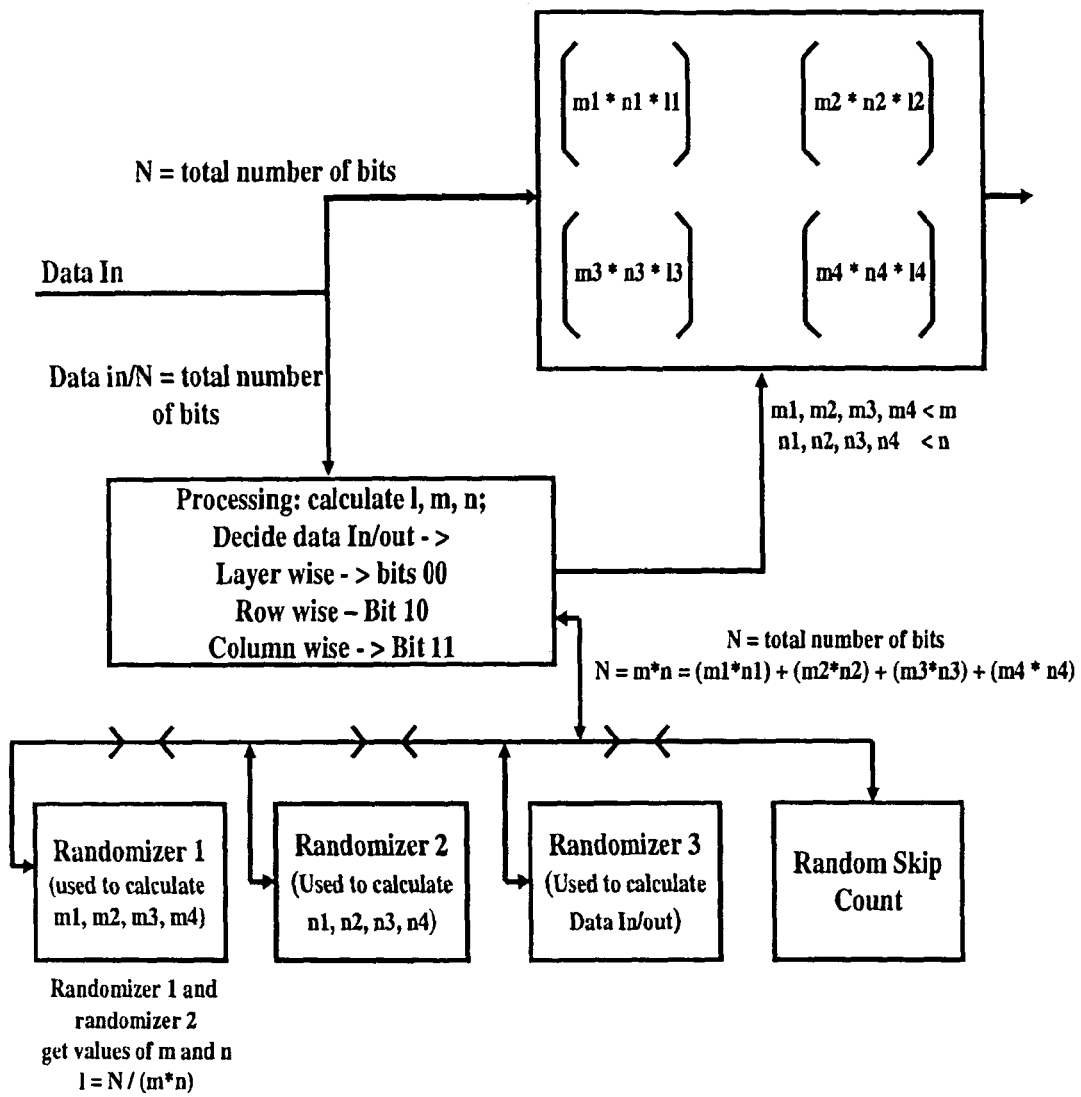

FIGS. 28 and 29 illustrate system architecture for dynamically interleaving sub-matrices for a 2-dimensional matrix and 3-dimensional matrix respectively according to exemplary embodiments of the present invention.

Referring to FIGS. 28 and 29, the proposed system permits to perform dynamic interleaving at the sub-matrices level individually. In the sub matrix concept, the main matrix is divided in the smaller matrices and sub matrices are used to fill the data of random size. For example, in the case of a 2D matrix, sub matrices with the sizes of m1:n1 . . . mx:my are used to randomize the data dynamically. Then, the total number of bits (N) can be calculated using Equation (3):

$$N = m \times n = (m1 \times n1) + (m2 \times n2) + (m3 \times n3) + (m4 \times n4) \quad \text{Equation (3)}$$

In order to dynamically interleave data in the form of sub matrices, the system maintains information on the overall data size. Further, for the measured over all data size, the system maintains sub-matrices. In one exemplary embodiment, one dynamic interleaving system can be used to randomize the individual sub-matrices or dedicated sub-dynamic interleaving systems can be used to speed-up the interleaving. In a 2-dimensional sub matrices interleaving system, 2 dimensional matrices are interleaved whereas, in case of a 3-dimensional sub matrices interleaving system, 3-dimensional sub matrices are interleaved and transmitted.

For a 2-dimensional matrix, the system arranges data in the form of rows and columns of a matrix. For a 3-dimensional matrix, the system arranges data in a 3-dimensional format, with data being arranged in 3 planes, namely rows, columns and layers.

Figure 30:
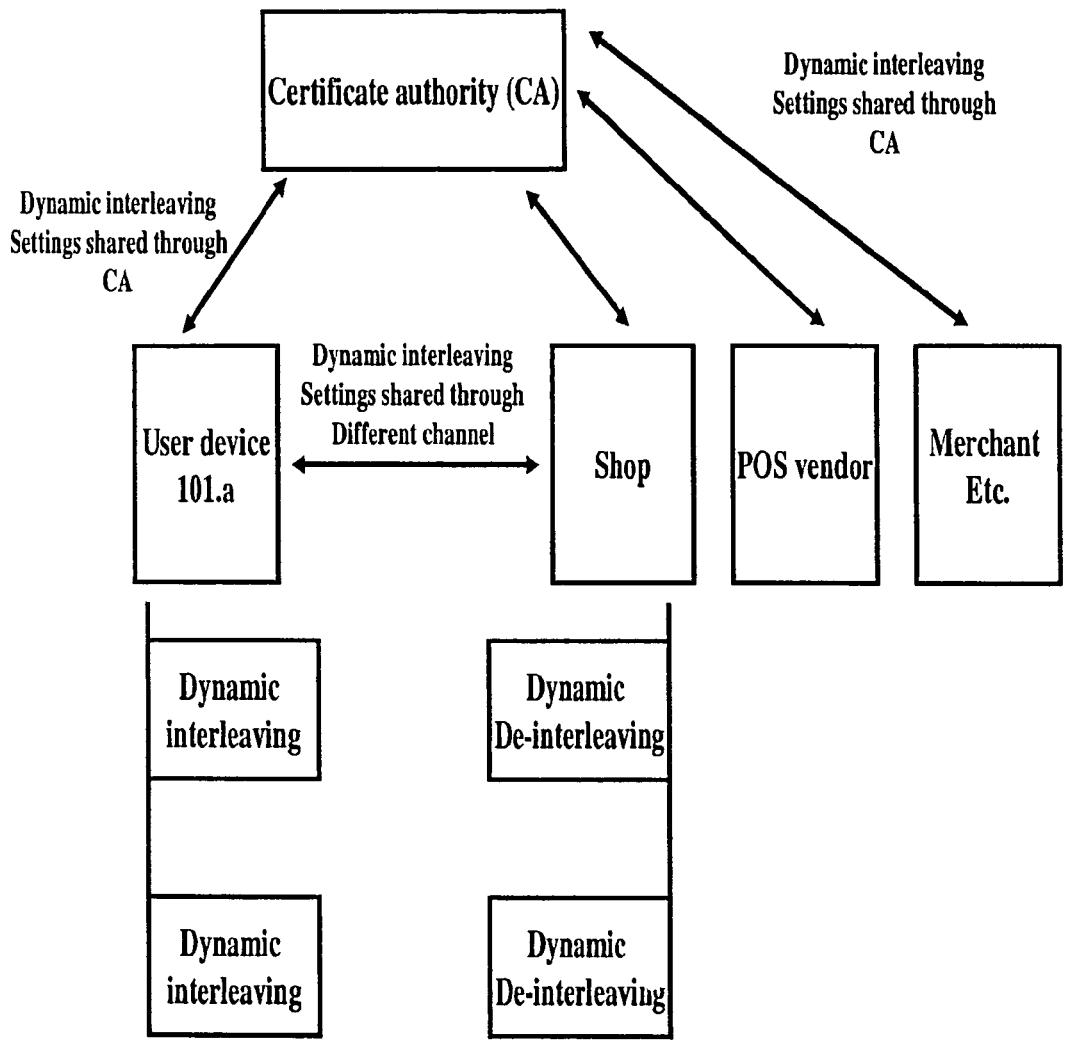
FIG. 30 illustrates a system architecture for sharing dynamically interleaved data and settings between a sender and a receiver according to an exemplary embodiment of the present invention.

FIG. 30 illustrates a system architecture for sharing dynamically interleaved data and settings between sender and receiver according to an exemplary embodiment of the present invention.

Referring to FIG. 30, the data to be transmitted from the user device 101.a to the destination is dynamically interleaved in the user device 101.a. The destination can be a second user device 101.b placed in a shop, with a Point of Service (POS) vendor, or with a merchant. Further, the dynamically interleaved data and the dynamic interleaving settings are shared with the destination device. In one exemplary embodiment, the dynamic interleaved data and the dynamic interleaved settings can be shared through different channels 102 for better security. In another exemplary embodiment, the dynamic interleaved data and the dynamic interleaved settings can be shared through same channels 102, in different time intervals for better security. In another exemplary embodiment, the dynamic interleaved settings corresponding to a dynamically interleaved data stream is shared only once between the transmitter device and the receiver device. The settings can be retransmitted for a DataStream only if any issue such as data loss or hacking has occurred. The settings can be transmitted before the dynamically interleaved data so that the receiver can perform real time de-interleaving of the received data. The channel used for sharing dynamically interleaved settings and parameters is to be a secured channel or an authorized CA. Further, the secured channel 102 can be wired or wireless.

FIGS. 31A, 31B and 31C illustrate settings/parameters 1, settings/parameters 2 and single bit representation of dynamic interleaving in NFC Data Exchange Format (NDEF) format respectively according to exemplary embodiments of the present invention.

Referring to FIGS. 31A and 31B, the settings/parameters shared between the transmitter user device 101.a and the receiver user device 101.b are divided into two parts namely settings/parameters 1 and settings/parameters 2. The settings/ parameters are shared with the transmitter and receiver by both parties using secured channel or through CA. The settings/parameters 1 (FIG. 31A) are less frequently changed and in case of any attack these parameters can be changed by the permission of both parties or from the recommendation of CA. The settings/parameters 1 comprise the following parameters.

Calculate m, n
A. Structure of randomizer 1
B. Initial word of randomizer 1
C. Initial clock
Random Skip Count (RSC)
D. Structure of randomizer for skip count
E. Initial word of randomizer for skip count
Data Filling/Releasing
F. Structure of randomizer for filling/releasing
G. Initial word of randomizer for filling/releasing
Data Filling/Releasing order
H. Structure of randomizer for order
I. Initial word of randomizer for order The settings/parameters that are changed frequently are represented using settings/parameters 2 (FIG. 31B). The settings/parameters 2 comprise the following parameters.

W. Total number of bits
X. Random skip

In an exemplary embodiment, the total number of bits can also be kept in the settings/parameter 1 section and only skip count will be communicated with other party in case of attack or data tracing. By doing this, the frequent sharing of the settings/parameters over the channel can be avoided. In another exemplary embodiment, device pairing can be done to set the settings/parameters for both the devices (transmitter and receiver) to avoid frequent use of sharing the settings/parameters. In another exemplary embodiment, a single bit indication is used in NDEF to represent that the data is randomly dynamic interleaved so the receiver would come to know and will use the dynamic interleaving to recover the data in secured manner. An indication bit is used to indicate dynamic random interleaving yes or no (1 or 0).

Referring to FIG. 31C, a single bit indication can be used in the NDEF. Using this indication, the receiver can identify if dynamic interleaving is done or not in the transmitted data and can decide if dynamic interleaving settings are to be used to recover data in secured manner. For example, value 1 of indication bit can indicate that dynamic interleaving is done and value 0 can indicate that dynamic interleaving is not done.

The exemplary embodiments disclosed herein can be implemented through at least one software program running on at least one hardware device and performing network management functions to control the elements. The elements shown in FIG. 3 include blocks that can be at least one of a hardware device, or a combination of hardware device and software module.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for facilitating a near field communication (NFC) between devices, the method comprising:
dynamically interleaving information to be transmitted using randomization by the first device;
transmitting dynamically interleaved data by the first device to the second device; and
transmitting dynamically interleaved settings by the first device to said second device,
wherein the interleaving comprises:
determining by the first device, at least one of a number of columns for a matrix, a number of rows for the matrix, a data filling format, a data releasing format, a data filling order, a data releasing order and a number of layers of the matrix and interleaving the information into the matrix according to said determining, and
wherein the number of columns or rows is calculated by:
processing a bit in set clock cycles by the first device;
fetching bits in a set location from the processed bit sequence by the first device; and
identifying the number of columns or rows corresponding to the fetched bits by the first device.

2. The method of claim 1, wherein the determining of the data filling or releasing format comprises:
processing a bit sequence in set clock cycles by the first device;
fetching bits in a set location from the processed bit sequence by the first device; and
identifying the data filling or releasing format corresponding to the fetched bits by the first device.

3. The method of claim 1, wherein the interleaving comprises performing interleaving by using a Random Skip Count.

4. The method of claim 1, wherein the interleaved data and the interleaving settings are transmitted at different time intervals in a single channel or are transmitted in different channels.

5. The method of claim 1, further comprising de-interleaving received data by the second device, on receiving the dynamically interleaved data and the dynamically interleaved settings from the first device,
wherein the de-interleaving further comprises:
receiving interleaved data by a second device;
receiving interleaving settings by the second device;
identifying a data releasing format by the second device; and
calculating a data releasing order by the second device.

6. The method of claim 5, wherein at least one of the data releasing format and the data relating order is identified from the received interleaved data by the second device.

7. A device for performing near field communication (NFC), the device comprising:
an interleaving module for dynamically interleaving information to be transmitted using randomization;
a transmitter module for transmitting dynamically interleaved data and dynamically interleaved settings to a counterpart device; and
a receiver module for receiving dynamically interleaved data and dynamically interleaved settings from a counterpart device,
wherein the interleaving module determines at least one of a number of columns for a matrix, a number of rows for the matrix, a data filling format, a data releasing format, a data filling order, a data releasing order, and a number of layers of the matrix, and interleaves information in a matrix according to said determining, and
wherein the interleaving module inputs a bit sequence to a first randomizer, processes the bit sequence in set clock cycles by the first randomizer, fetches bits in a set location from the processed bit sequence, and identifies the number of columns or rows corresponding to the fetched bits.

8. The device of claim 7, wherein the interleaving module inputs a bit sequence to a second randomizer, processes the bit sequence in set clock cycles by the second randomizer, fetches bits in a set location from the processed bit sequence, and identifies the data filling or releasing format corresponding to the fetched bits.

9. The device of claim 7, wherein the interleaving module uses a Random Skip Count to perform interleaving.

10. The device of claim 7, wherein the transmitter module transmits the interleaved data and the interleaved settings at different time intervals of a single channel or transmits them in different channels.

11. The device of claim 7, wherein the interleaving module receives received interleaved data and settings, and determines a data releasing format and a data releasing order to perform deinterleaving.

12. The device of claim 11, wherein at least one of the data releasing format and the data releasing order is determined based on the received interleaved data.

* * * * *